United States Patent
Bois et al.

(10) Patent No.: US 12,546,706 B2
(45) Date of Patent: Feb. 10, 2026

(54) OPTICAL REFERENCING FROM OPTICAL REFERENCES WITH VARIABLE PERTURBATIVE DRIFT RATES

(71) Applicant: Ciena Corporation, Hanover, MD (US)

(72) Inventors: Antoine Bois, Québec (CA); Claude Gamache, Gatineau (CA); Francois Pelletier, Québec (CA)

(73) Assignee: Ciena Corporation, Hanover, MD (US)

( * ) Notice: Subject to any disclaimer, the term of this patent is extended or adjusted under 35 U.S.C. 154(b) by 987 days.

(21) Appl. No.: 17/709,681

(22) Filed: Mar. 31, 2022

(65) Prior Publication Data

US 2023/0314310 A1 Oct. 5, 2023

(51) Int. Cl.
*H04B 10/572* (2013.01)
*G01N 21/27* (2006.01)
*H01S 5/0687* (2006.01)
*H01S 5/14* (2006.01)

(52) U.S. Cl.
CPC ......... *G01N 21/274* (2013.01); *H01S 5/0687* (2013.01); *H01S 5/142* (2013.01); *H04B 10/572* (2013.01)

(58) Field of Classification Search
CPC ..... G01N 21/274; H01S 5/0687; H01S 5/142; H01S 5/0014; H01S 5/1032; H04B 10/572; G01J 3/0286; G01J 3/28; G01J 9/02
See application file for complete search history.

(56) References Cited

U.S. PATENT DOCUMENTS

| | | | |
|---|---|---|---|
| 6,519,302 B1 | 2/2003 | Bruce et al. |
| 6,842,567 B2 | 1/2005 | Lachance et al. |
| 6,871,304 B2 | 3/2005 | Hadjihassan et al. |
| 6,980,140 B1 | 12/2005 | Rowland et al. |
| 7,352,931 B1 | 4/2008 | Painchaud et al. |

(Continued)

FOREIGN PATENT DOCUMENTS

| | | | | |
|---|---|---|---|---|
| CN | 113029218 A | * | 6/2021 | ......... G01D 5/35329 |
| EP | 3750240 A1 | | 12/2020 | |

(Continued)

OTHER PUBLICATIONS

Lun-Kai Cheng, Peter Martijn Toet; 7—Innovative Fiber Bragg Grating Sensors for Highly Demanding Applications; Opto-Mechanical Fiber Optic Sensors; 2018; Butterworth-Heinemann; pp. 175-209; ISBN 9780128031315; https://doi.org/10.1016/B978-0-12-803131-5.00007-6 (Year: 2018).*

(Continued)

*Primary Examiner* — Michelle M Iacoletti
(74) *Attorney, Agent, or Firm* — Baratta Law PLLC; Lawrence A. Baratta, Jr.

(57) ABSTRACT

Systems and methods provide optical referencing in an optical system including a plurality of optical devices with variable perturbative drift rates. A method includes, subsequent to determining a tuning rate of one or more interrogator devices, which are tunable, and subsequent to locking the plurality of optical devices including the one or more interrogator devices, detecting a drift in spectrum of the optical system based on a perturbation; and tracking the drift based on variable perturbative drift rates of each of the plurality of optical devices which are each exposed to the perturbation.

20 Claims, 17 Drawing Sheets

(56) References Cited

U.S. PATENT DOCUMENTS

| | | | |
|---|---|---|---|
| 7,565,084 B1 * | 7/2009 | Wach | H04J 14/04 398/201 |
| 7,711,224 B1 | 5/2010 | Pelletier et al. | |
| 7,940,822 B1 | 5/2011 | Cao et al. | |
| 8,095,615 B2 | 1/2012 | Briscoe et al. | |
| 8,126,332 B2 | 2/2012 | Bainbridge et al. | |
| 8,306,419 B2 | 11/2012 | Luk et al. | |
| 8,306,422 B2 | 11/2012 | Bainbridge et al. | |
| 8,406,621 B2 | 3/2013 | Painchaud et al. | |
| 8,767,778 B2 | 7/2014 | Briscoe et al. | |
| 9,477,036 B2 | 10/2016 | Pelletier | |
| 9,625,662 B2 | 4/2017 | Luk et al. | |
| 9,823,419 B1 | 11/2017 | Pelletier et al. | |
| 9,851,521 B2 | 12/2017 | Pelletier et al. | |
| 9,941,973 B2 | 4/2018 | Simard et al. | |
| 10,197,821 B2 | 2/2019 | Poulin et al. | |
| 10,663,663 B2 | 5/2020 | Painchaud et al. | |
| 10,715,169 B1 | 7/2020 | Aouini et al. | |
| 10,830,638 B2 | 11/2020 | Pelletier et al. | |
| 11,099,065 B2 | 8/2021 | Luk et al. | |
| 11,227,790 B1 | 1/2022 | Filion et al. | |
| 2003/0185258 A1 | 10/2003 | Dyer et al. | |
| 2004/0008413 A1 | 1/2004 | Trepanier et al. | |
| 2010/0129077 A1 | 5/2010 | Bainbridge et al. | |
| 2012/0063474 A1 | 3/2012 | Ayotte et al. | |
| 2013/0188918 A1 | 7/2013 | Painchaud et al. | |
| 2020/0014354 A1 | 1/2020 | Luk et al. | |
| 2020/0064707 A1 | 2/2020 | Vitic et al. | |
| 2020/0363665 A1 | 11/2020 | Latrasse et al. | |
| 2021/0124234 A1 | 4/2021 | Vitic et al. | |
| 2021/0266066 A1 | 8/2021 | Bois et al. | |
| 2022/0050043 A1 * | 2/2022 | Ozdemir | G01N 15/1456 |
| 2022/0065743 A1 | 3/2022 | Simard et al. | |

FOREIGN PATENT DOCUMENTS

| | | |
|---|---|---|
| WO | 2010009533 A1 | 1/2010 |
| WO | 2021113137 A1 | 6/2021 |

OTHER PUBLICATIONS

NIST; Glossary—Calibration; Jul. 14, 2021; https://csrc.nist.gov/glossary/term/calibration ; https://web.archive.org/web/20210714185812/https://csrc.nist.gov/glossary/term/calibration (Year: 2021).*

* cited by examiner

OPTICAL REFERENCING FROM OPTICAL REFERENCES WITH VARIABLE PERTURBATIVE DRIFT RATES

FIELD OF THE DISCLOSURE

The present disclosure generally relates to optical components. More particularly, the present disclosure relates to systems and methods for optical referencing from optical references with variable perturbative drift rates, namely for wavelength calibration or locking.

BACKGROUND OF THE DISCLOSURE

Optical components require an optical reference for calibration, locking, etc. The existing approaches include full athermal references, a drifting reference but positioned sufficiently close to an accurate temperature sensor, a free space locker such as in tunable lasers, etc. For example, a partially athermal wavelength meter is described in Brian Stern, Kwangwoong Kim, Harry Gariah, and David Bitauld, "Athermal silicon photonic wavemeter for broadband and high-accuracy wavelength measurements," Opt. Express 29, 29946-29959 (2021), the contents of which are incorporated by reference.

Cost is the main disadvantage of the existing approaches. Also, placement and proper packaging of an accurate and stable temperature sensor can be difficult while also increasing cost, size and complexity. Further, a free space locker is, by definition, not integrable in the silicon photonics (SiP) chip, and requires complex assembly and a lot of space in an optical package.

BRIEF SUMMARY OF THE DISCLOSURE

The present disclosure relates to systems and methods for optical referencing from optical references with variable perturbative drift rates, namely for wavelength calibration or locking. The observed drift between two or more optical devices is mapped to a wavelength (or frequency) on an absolute scale. This does not require the presence of a temperature sensor except possibly in a factory calibration step. For a tunable laser, the present disclosure allows the integration of a wavelength meter function within the silicon photonics chip which allows proper control of its frequency over life without using other frequency locking mechanism (such as a free space locker). The present disclosure relates to a wavelength calibration or locking method. It makes uses of at least two optical devices with interference-based features in their spectrum. Examples include, but are not limited to, ring or disk resonators, Mach-Zehnder or Michelson interferometers, Fabry-Perot etalons, Bragg gratings, thin-film filters, and the like.

Advantageously, the present disclosure considers that sensitive or imperfect optical references can reference each other, or an unknown light source, with a few basic assumptions. More specifically, the present disclosure includes equations that lead to the steps in referencing either 1) wavelength selective devices (e.g., optical resonators) together, or 2) an unknown continuous wave (CW) light. The passive or active resonators are calibrated to know their beginning-of-life (BOL) states and relative drift rates. Then, after a perturbation has occurred, their relative frequency drifts to each other, as found from a re-alignment or otherwise, is mapped directly to an absolute frequency scale. We also describe a situation with gradients and offer a few alternatives to obtain a precise measurement.

In an embodiment, a method is described for optical referencing in an optical system including a plurality of optical devices with variable perturbative drift rates. The method includes, subsequent to determining a tuning rate of one or more interrogator devices, which are tunable, and subsequent to locking the plurality of optical devices including the one or more interrogator devices, detecting a drift in spectrum of the optical system based on a perturbation; and tracking the drift based on variable perturbative drift rates of each of the plurality of optical devices which are each exposed to the perturbation. The tracking can be based on knowledge of an initial state based on the locking and knowledge of the variable perturbative drift rates. The method can further include for calibration, determining the tuning rate of one or more interrogator devices; locking the plurality of optical devices by maximizing optical power at an output of the optical system; and storing an obtained operating point on the one or more interrogators after the locking. The variable perturbative drift rates can be predetermined based on material properties of the plurality of optical devices, at least two devices having different materials.

The plurality of optical devices can include any of ring or disk resonators, Mach-Zehnder or Michelson interferometers, Fabry-Perot etalons, Bragg gratings or thin-film filters. The method can further include determining a wavelength of a source utilizing the tracking. The method can further include performing a measurement based on the tracking. The plurality of optical devices includes at least three optical devices, and wherein the method can further include performing the tracking based on gradients of the variable perturbative drift rates between the at least three optical devices. The optical system can exclude a temperature sensor. The optical system can be one of a tunable laser and an optical channel monitor (OCM).

In another embodiment, an optical system configured to provide optical referencing includes a source; a plurality of optical devices including one or more interrogator devices, which are tunable, connected to the source; a photodetector connected to the plurality of optical devices; and circuitry configured to, subsequent to a determination of a tuning rate of the one or more interrogator devices, and subsequent to locking the plurality of optical devices, detect a drift in spectrum of the optical system based on a perturbation, and track the drift based on variable perturbative drift rates of each of the plurality of optical devices which are each exposed to the perturbation. The circuitry can be configured to track the drift based on knowledge of an initial state after the locking and knowledge of the variable perturbative drift rates. The circuitry can include a stored value for the tuning rate of one or more interrogator devices, and obtained operating points on the one or more interrogators after the locking.

The variable perturbative drift rates can be predetermined based on material properties of the plurality of optical devices, at least two devices having different materials. The plurality of optical devices can include any of ring or disk resonators, Mach-Zehnder or Michelson interferometers, Fabry-Perot etalons, Bragg gratings or thin-film filters. The circuitry can be configured to determine a wavelength of the source based on the drift. The circuitry can be configured to perform a measurement based on the drift. The plurality of optical devices can include at least three optical devices, and wherein the circuitry can be configured to track the drift based on gradients of the variable perturbative drift rates between the at least three optical devices. The optical system can be one of a tunable laser and an optical channel monitor (OCM). The optical system can include a series of cascaded integrated resonators each with a through port and a drop port, and wherein the circuitry is further configured to calibrate a first integrated resonator utilizing its through port and subsequently calibrate remaining integrated resonators.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
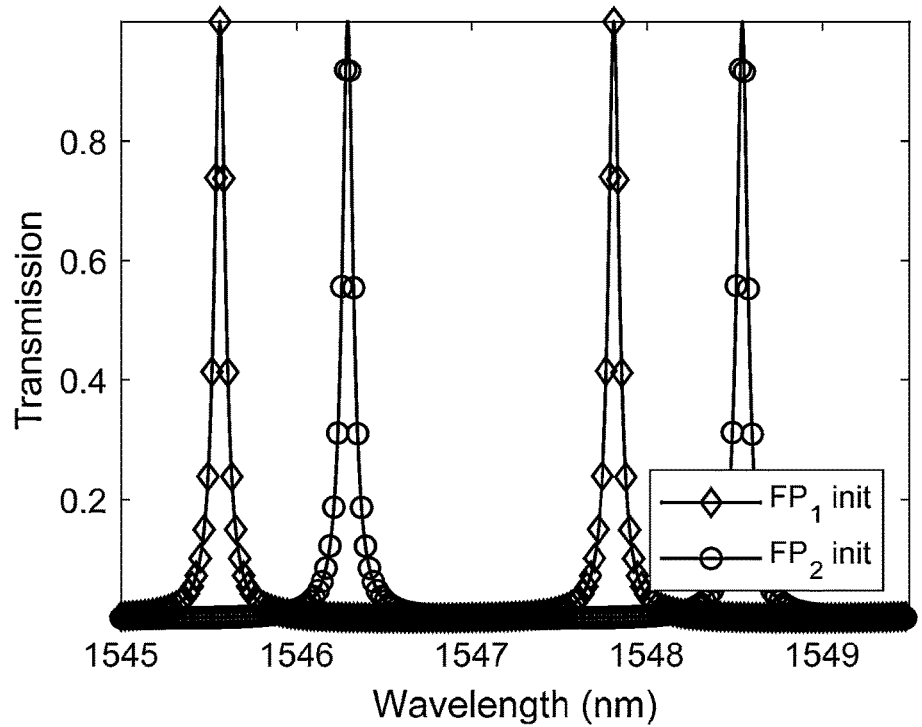
FIGS. 1 and 2 are graphs illustrating the system under consideration with two Fabry-Perot (FP) etalons $FP_1$, $FP_2$ producing drifting (redshifting) Lorentzian linewidths, where FIG. 1 are initial values and FIG. 2 are perturbed values.

Again, the present disclosure relates to systems and methods for optical referencing from optical references with variable perturbative drift rates, namely for wavelength calibration or locking. Also, the present disclosure relates to systems and methods for calibration of cascaded tunable optical filtering elements.

Optical Referencing

Advantageously, this enables vertical integration with SiP chips. By removing the athermality requirement for optical references, this can reduce their cost significantly (50+%) or enable options that are effectively nearly free (e.g., integrated silicon nitride (SiN) disks in addition to Si ring resonators, on the same platform). The removal of the need for a precise temperature sensor is also significant.

As an example, future version of QSFP-DD transceivers may need a custom reduced size and reduced power consumption tunable laser, and the use of the integrated wavemeter function in the SiP would enable the removal of the currently used frequency reference.

Again, the present disclosure makes uses of at least two optical devices with interference-based features in their spectrum. Examples include, but are not limited to, ring or disk resonators, Mach-Zehnder or Michelson interferometers, Fabry-Perot etalons, Bragg gratings, thin-film filters, and the like. A standard property of these optical devices is for their spectrum to drift in wavelength according to external perturbations. These perturbations can be, for example, a temperature or pressure drift. In a first order expansion, this sensitivity can be expressed as:

$$d\lambda_f/dP=(\lambda/n_g)dn_{eff}/dP,$$

where $\lambda_f$ is the wavelength of a feature under consideration, P is the perturbation in question, $n_g$ is the group index, a property of the propagating optical mode (which can take any form up to a plane wave), $\lambda$ is the initial wavelength of operation, and $n_{eff}$ is the effective index of the propagating optical mode. The same formula can be expressed in frequency.

The sensitivity $dn_{eff}/dP$ can be further decomposed into the sensitivity of the individual materials interacting with the optical mode:

$$dn_{eff}/dP=\Sigma_i w_i dn_i/dP+\Sigma_i n_i dw_i/dP,$$

where i labels the individual materials, and $0 \leq w_i \leq 1$ is a weight from the fraction of the light in this material. Most often, the first sum is dominant over the second one by a few orders of magnitude. This sensitivity can be determined experimentally.

Consider two optical devices made of different materials or with different guiding characteristics, such that their respective drifts to a specific perturbation differ. If they are then exposed to this same perturbation, a spectral feature can be tracked on an absolute scale by knowing the initial shape of the device respective spectra (transmission or reflection) and the relative drift rate between the two devices, without either being insensitive to this perturbation (e.g., athermal), thereby removing the athermality requirement for optical references.

Figure 2:
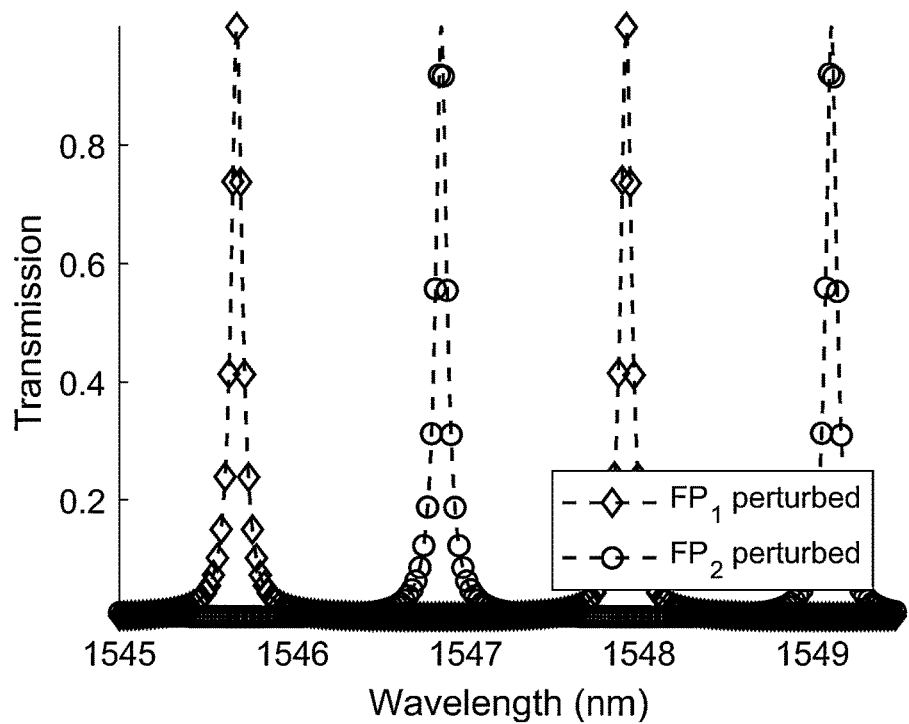

FIGS. 1 and 2 are graphs illustrating the system under consideration with two Fabry-Perot (FP) etalons $FP_1$, $FP_2$ producing drifting (redshifting, e.g., drift toward longer wavelengths) Lorentzian linewidths, where FIG. 1 are initial values and FIG. 2 are perturbed values. In FIG. 1, the starting spectra for the two FP etalons $FP_1$, $FP_2$ are the full lines. The free spectral range (FSR) for both is 2.25 nm, although it could differ in other embodiments. The FSR does not matter as long as it is large enough with respect to the expected frequency drifts for the desired application, because the features must not be confused for each other— i.e., their ordering matters (the tracking can be performed within a FSR at the most—the FSR must be larger than the application expected frequency drift). The initial positions of the resonances differ. The dashed lines show their redshift (increase in resonant wavelength) from a similar perturbation, for example temperature. The second $FP_2$ has a drift rate that is greater by a factor of five compared to the first one $FP_1$. This can be for example a FP made of SiN (diamond markers, $FP_1$) and a FP made of Si (circle markers, $FP_2$), which does produce a ratio of roughly 5×; a FP of Si and another of SiO2, on the other hand, would produce a ratio of roughly 10×.

A situation in which optical referencing can occur is one in which the final positions are unknown (because they have drifted from their original location due to an unknown, but identical or very similar perturbation applied to both of them), but:

1) at least one the devices can be tuned (i.e., shifted along the wavelength axis with a controlled perturbation)— which we can call "interrogators",
2) the initial positions are known (from a beginning-of-life (BOL) factory calibration step) for a known perturbative profile (e.g., temperature).

Consider a standard situation in integrated optics in which one device is a Si ring resonator with a thermal tuner. The exact amount of tuning to be applied can be precisely known in rads per unit of power. Because we know that a full FSR constitutes $2\pi$ rads, we can translate this tuning to units of wavelength or frequency per unit of power. Limited aging of this tuner and of the initial untuned positions are critical for the method to be accurate (both will limit the ultimate accuracy of the frequency measurement).

Figure 3:
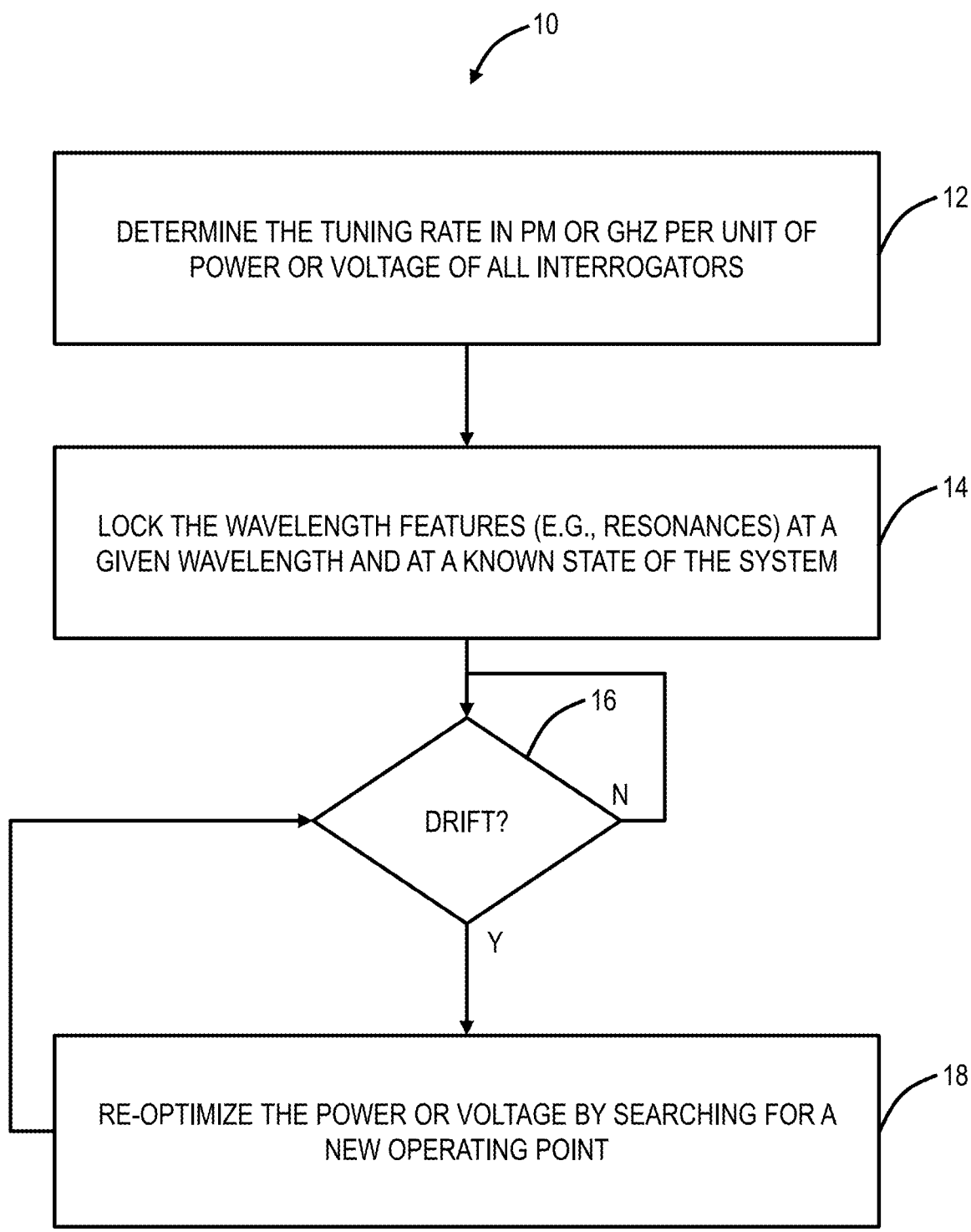
FIG. 3 is a flowchart of a process for optical referencing using two or more optical devices.

FIG. 3 is a flowchart of a process 10 for optical referencing using two or more optical devices. The process 10 includes a determination of the tuning rate in picometers (pm) or GHz per unit of power or voltage of all interrogators (step 12). The process 10 includes a lock of the wavelength features (e.g., resonances) at a given wavelength and at a known state of the system (temperature, pressure, etc.) (step 14). If the devices' FSR differ, they will only do so (align simultaneously) at one wavelength at a time. If there are two devices and one of the devices is passive, then the other device must be tuned to find this alignment of the features (tunable device gets tuned until one of its resonances aligns with one of the resonances of the passive device). To lock them together is done through a plurality of possible methods including direct power maximization on a photodiode recording the transmission of both devices in series or by convolution.

Figure 4:
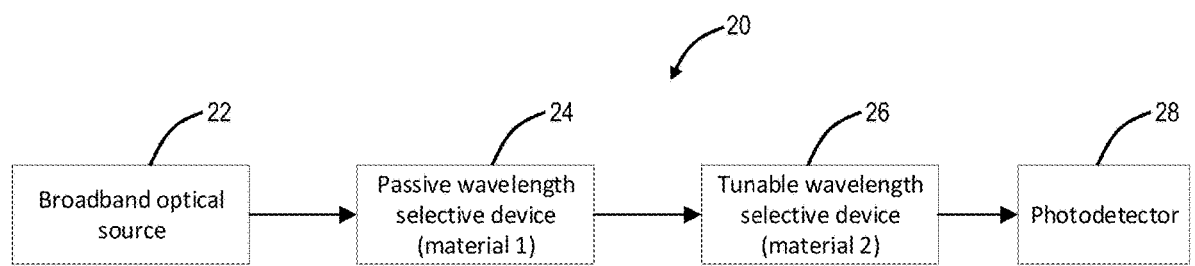
FIGS. 4, 5, and 6 are block diagrams of optical systems illustrating wavelength locking, where FIG. 4 includes a passive and tunable device, FIG. 5 includes two tunable devices, and FIG. 6 includes two tunable devices with an unknown frequency of a source.
Figure 5:
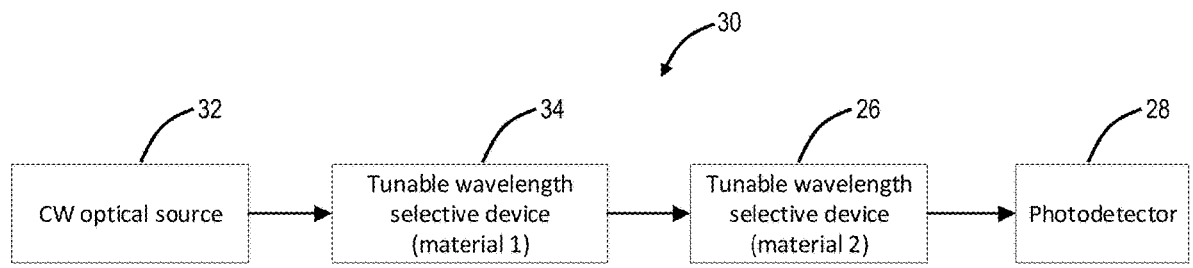
Figure 6:
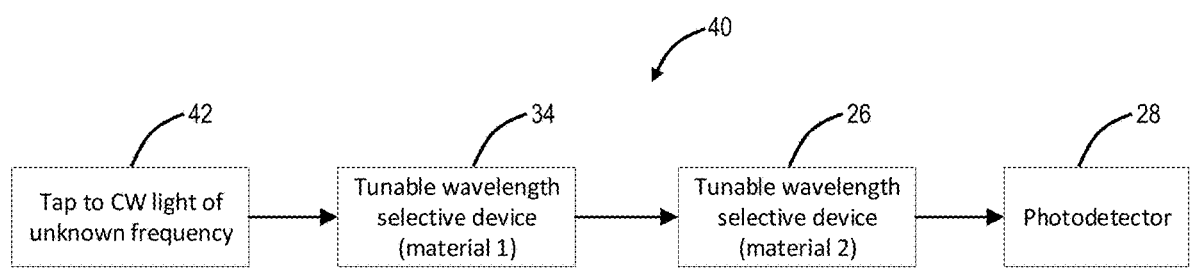

FIGS. 4, 5, and 6 are block diagrams of optical systems 20, 30, 40 illustrating wavelength locking, where FIG. 4 includes a passive and tunable device, FIG. 5 includes two tunable devices, and FIG. 6 includes two tunable devices with an unknown frequency of a source. FIG. 4 includes a broadband optical source 22, a first passive wavelength selective device 24 using a first material, a second tunable wavelength selective device 26 using a second material, and a photodetector 28. Here, the broadband optical source 22 has a range of wavelengths. The passive wavelength selective device 24 has fixed resonance, and the tunable wavelength selective device 26 has tunable resonance. The photodetector 28 is configured to detect optical power.

FIG. 5 includes a CW optical source 32, a first tunable wavelength selective device 34 at a first material, a second tunable wavelength selective device 36 at a second material, and a photodetector 38. The optical system 20 is used when there is the broadband optical source 22. The optical system 30 can be used if the two optical references are tunable, or a broadband optical source is unavailable.

If using pass-through resonances in the optical systems 20, 30, these would be locked by simply maximizing the transmitted optical power on the photodetector 28, which is achieved by tuning one or both wavelength selective devices 26, 34. The perturbation must not be so large that the wrong (periodic) features are aligned by mistake, which requires designing the FSR around the expected perturbations for a specific application. Note the obtained operating point on the tunable element(s). This completes the BOL calibration steps 12, 14.

In FIG. 3, the process 10 includes waiting for the optical systems 20, 30, 40 to drift (step 16). This can be confirmed by noticing the optical power dropping on the photodetector 28 when using one of the configurations above at the same operating point. The process 10 includes a re-optimization of the power by searching for a new operating point (step 18). The difference between the new and old operating points can be translated to a drift in units of wavelength or frequency.

Knowing the ratio of the device drift rates, a constant that is known from material properties or from a calibration step, we can find out how much the main device of interest drifted. If we call $r_{ratio}=r_1/r_2$ this drift rate ratio, with $r_1>r_2$, then:

$$\Delta\lambda_1/\Delta\lambda_2=r_1/r_2=r_{ratio}, \text{ and}$$

$$\Delta\lambda_{obs}=\Delta\lambda_1-\Delta\lambda_2=r_{ratio}\Delta\lambda_2-\Delta\lambda_2=(r_{ratio}-1)\Delta\lambda_2,$$

which implies:

$$\Delta\lambda_2=\Delta\lambda_{obs}/(r_{ratio}-1), \text{ and}$$

$$\Delta\lambda_1=r_{ratio}\Delta\lambda_2=r_{ratio}\Delta\lambda_{obs}/(r_{ratio}-1),$$

where $\Delta\lambda_{obs}\equiv\Delta\lambda_1-\Delta\lambda_2=\Delta\lambda_{perturbed}-\Delta\lambda_{BOL}$ is the observed wavelength shift between the two devices as found from a re-alignment in wavelength ($\Delta\lambda_{BOL}$ being an initial misalignment between two features from a BOL calibration), and where $\Delta\lambda_1=\lambda_{1(perturbed)}-\lambda_{1(BOL)}$ and $\Delta\lambda_2=\lambda_{2(perturbed)}-\lambda_{2(BOL)}$ are the absolute drifts of a wavelength feature (e.g., a resonance) for the respective devices from an initial BOL position. These relations implies that the starting positions need not be known from a random initialization with a random perturbation if the device has been calibrated before. In fact, from the equation above, one notices that $\Delta\lambda_{obs}$ maps directly to a wavelength on an absolute scale for either device, thus referencing both at the same time. Knowing the exact drift rates $r_1$ and $r_2$ also allows reconstructing the exact perturbation as $\Delta\lambda_i=r_i\Delta P_i$, where $\Delta P_i$ is the perturbation from a BOL state.

This operation can be repeated at many optical features within the optical band of interest to improve accuracy. Each feature must simply be calibrated beforehand in the same manner. Using many resonance peaks, for instance, can also help to deal with (sometimes difficult to calibrate) FSR dispersion. Using many features can also help account for a wavelength dependence to the perturbation.

Figure 7:
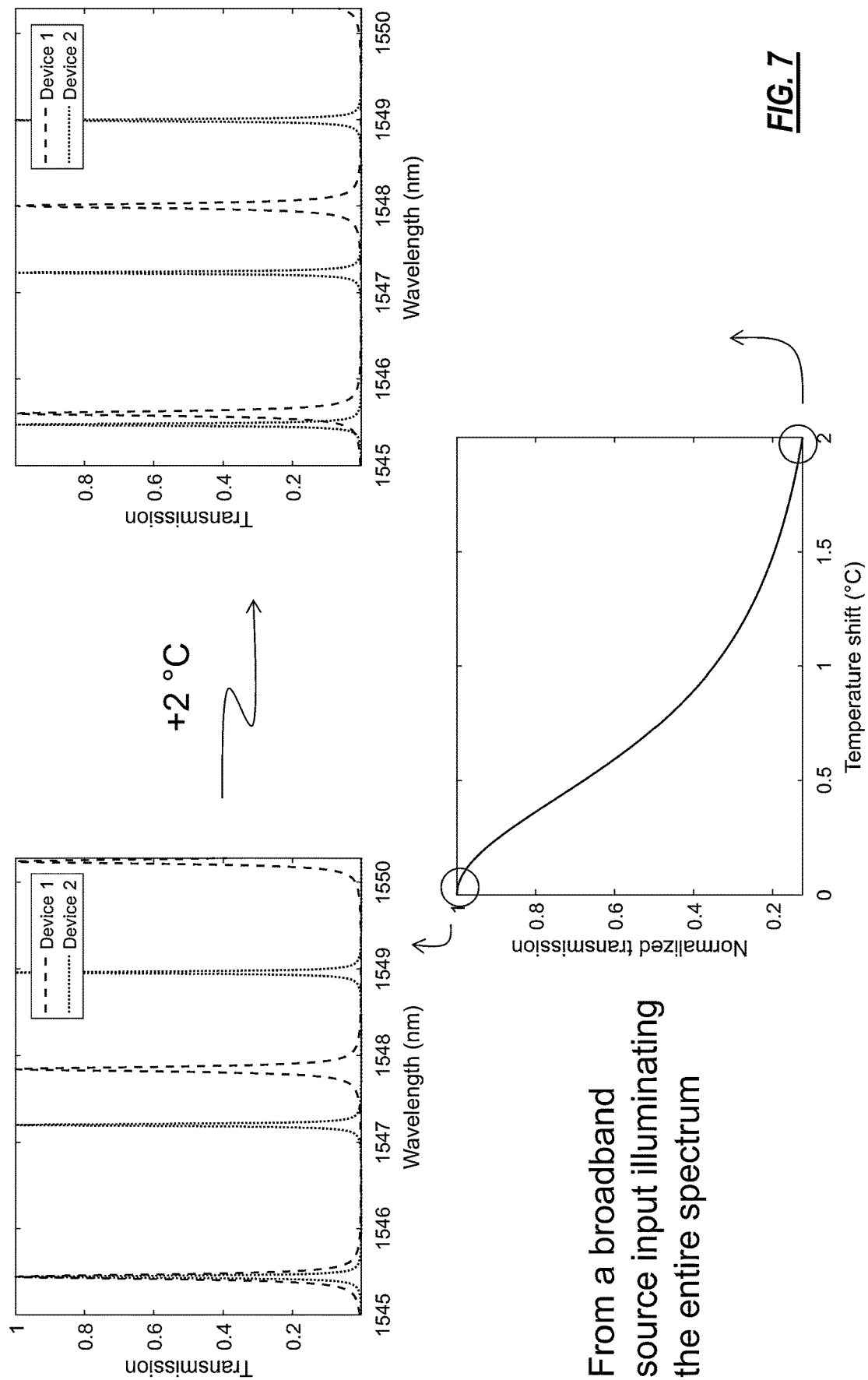
FIG. 7 is graphs illustrating a schematic example of inferring a misalignment between two optical resonances from a sufficiently high slope or difference between two readings.

The tunability is not strictly necessary if $\Delta\lambda_{obs}$ can be inferred from e.g., a sufficiently high slope or difference between two readings. FIG. 7 is graphs illustrating a schematic example of inferring a misalignment between two optical resonances from a sufficiently high slope or difference between two readings.

The process 10 is said to be self-referencing if the tunable element being referenced is also used in an optical circuit for other purposes, e.g., as a wavelength selective element in an optical channel monitor (OCM). The process 10 can be extended to situations in which the incoming light must be referenced on an absolute scale (such as for locking a laser cavity), such as illustrated in FIG. 6 for the optical system 40, which is similar to the optical system 30, and includes CW light, such as from a tap, at an unknown frequency.

In the case of wavelength locking, the lasing wavelength would be known approximately, with some uncertainty. The process is done in two main steps:

1) Use the process 10 to extract a $\Delta\lambda_{obs}$, and therefore $\Delta\lambda_1$ and $\Delta\lambda_2$ using the relations above.
2) Record the net additional common-mode tuning $\Delta\lambda_{comm}=\Delta\lambda_{comm(realign)}-\Delta\lambda_{comm(BOL)}$ necessary to lock to the expected feature.

The obtained $\Delta\lambda_{obs}$ remains the result of the two wavelength selective elements drifting from a common perturbation (thus relaxing a requirement of athermality, pressure insensitivity, etc.). They map to an absolute wavelength from the BOL calibration wavelengths. The common-mode contribution is the wavelength shift of this unknown CW light from these BOL calibration wavelengths. If $\Delta\lambda_1$ and $\Delta\lambda_2$ are understood to represent a wavelength shift from the BOL calibration wavelengths $\lambda_{1(BOL)}$ and $\lambda_{2(BOL)}$, respectively, due to a perturbation, then more complete expressions become $\lambda_1=\lambda_{1(BOL)}+\Delta\lambda_1+\Delta\lambda_{comm}=\lambda_{1(BOL)}+(\lambda_{1(perturbed)}-\lambda_{1(BOL)})+\Delta\lambda_{comm}$ and $\lambda_2=\lambda_{2(BOL)}+\Delta\lambda_2+\Delta\lambda_{comm}=\lambda_{2(BOL)}+(\lambda_{2(perturbed)}-\lambda_{2(BOL)})+\Delta\lambda_{comm}$.

Even with two devices, there remains a single estimate of the unknown CW wavelength:

$\lambda_{cw}=\lambda_{cw(BOL)}+\Delta\lambda_{comm}$, as $\Delta\lambda_{comm}$ is derived from an extraneous wavelength shift common to both.

If multiple perturbations exist simultaneously, then the relative drift rate between the optical references must remain the same. Most often, the sensitivity to any perturbation is directly proportional to the base value of the refractive index of the material itself, or to the refractive index contrast between a core and cladding material, such that this condition is respected.

Figure 8:
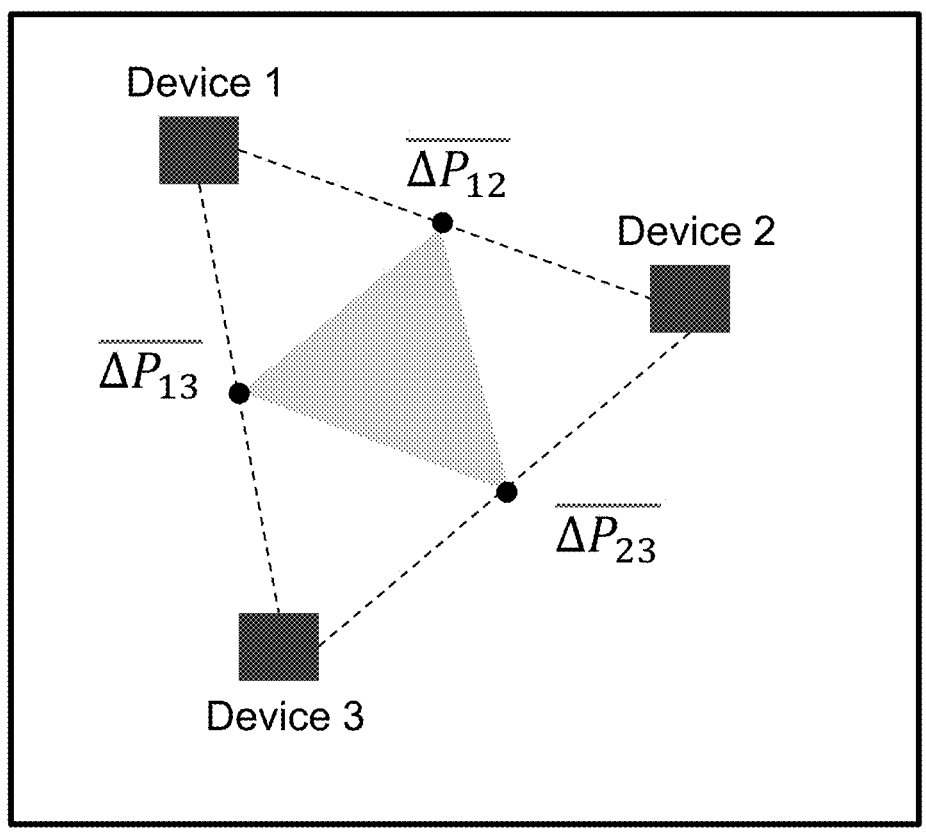
FIG. 8 is a schematic diagram of handling three wavelength selective elements with a full map for ΔP.

Without much additional complexity, the process can also handle the presence of gradients in the perturbations. If there are multiple wavelength selective elements involved, then each one possesses its respective $\Delta\lambda_{obs}$ from the others. If there are n independent references, then there can be as many as n(n−1)/2 pairs. The pairings still require two devices of different materials. If a gradient develops, then the as many as (n−1) number of calculated $\Delta\lambda_{ij}$ for the $i^{th}$ device as calculated from all {i, j} pairs will slightly disagree. Each $\Delta\lambda_{ij}$ implies, with linearization, an average $\overline{\Delta P_{ij}}$ between the pair, from the relationship $\Delta\lambda_{ij}=r_i\overline{\Delta P_{ij}}$. A full map for $\Delta P$ can be interpolated at every spatial point from common approaches in the realization of contour maps. FIG. 8 is a schematic diagram of handling three wavelength selective elements with a full map for $\Delta P$.

Another way of approaching the problem of gradients is trying to solve the following linear system, here simplified to the minimum system of three independent references:

$$\begin{bmatrix} r_1 & -r_2 & 0 \\ 0 & r_2 & -r_3 \\ r_1 & 0 & -r_3 \end{bmatrix} \begin{bmatrix} \Delta P_1 \\ \Delta P_2 \\ \Delta P_3 \end{bmatrix} = \begin{bmatrix} \Delta\lambda_{obs,1\text{-}2} \\ \Delta\lambda_{obs,2\text{-}3} \\ \Delta\lambda_{obs,1\text{-}3} \end{bmatrix}.$$

However, it is readily apparent that the square matrix on the left is singular, thus preventing the system from being solved directly. One of the perturbations $\Delta P_i$ must either be made dependent on the others or must assume a specific value, which can be derived from the computed $\overline{\Delta P_{ij}}$.

Quantitative Example

The following two devices are used to illustrate an example:

| Device | Type | Drift rate | FSR | Tunable? |
|---|---|---|---|---|
| 1 | Si ring resonator | 80 pm/° C. | 2.40 nm | yes |
| 2 | SiN disk | 16 pm/° C. | 1.76 nm | no |

Figure 9:
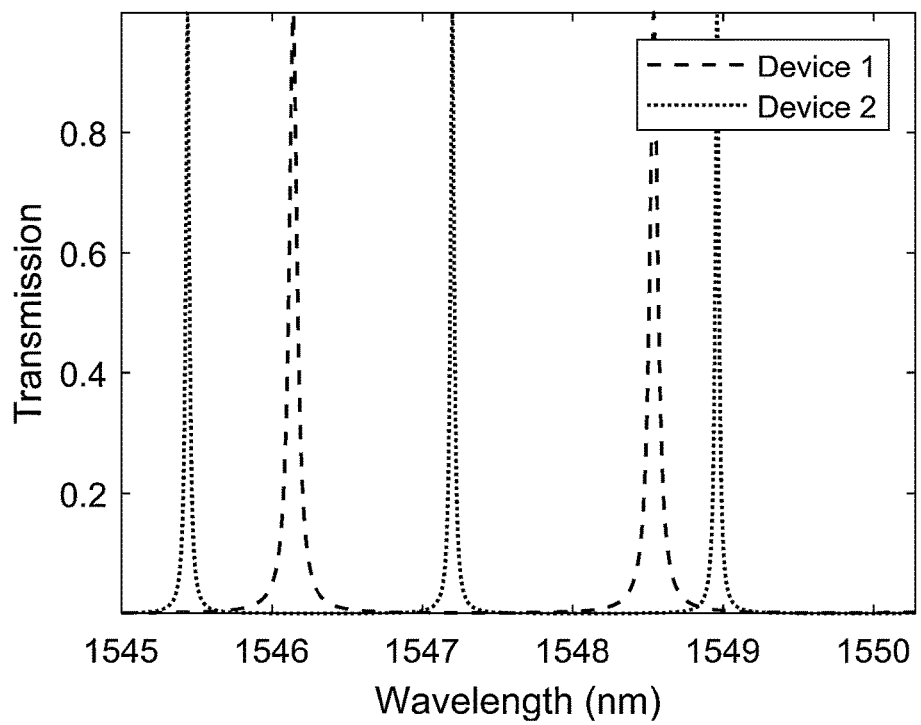
FIG. 9 is a graph of the two devices 1, 2 illustrating an initial random beginning-of-life (BOL) state.
Figure 10:
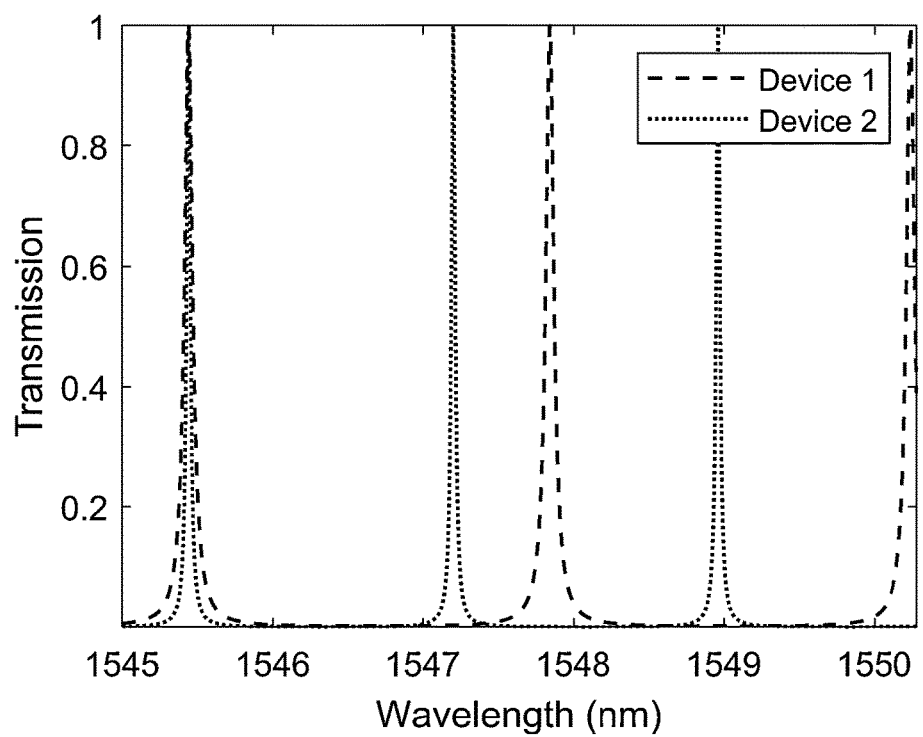
FIG. 10 is a graph of the two devices 1, 2 illustrating locking to a chosen peak, namely BOL calibration.

FIG. 9 is a graph of the two above devices 1, 2 illustrating an initial random BOL state. FIG. 10 is a graph of the two above devices 1, 2 illustrating locking to a chosen peak, namely BOL calibration. Here, the device 1 is tuned to lock with the device 2 at a chosen peak at about 1545.5 nm and with $\Delta\lambda_{BOL}$=+0.70 nm, or equivalently −1.70 nm.

Figure 11:
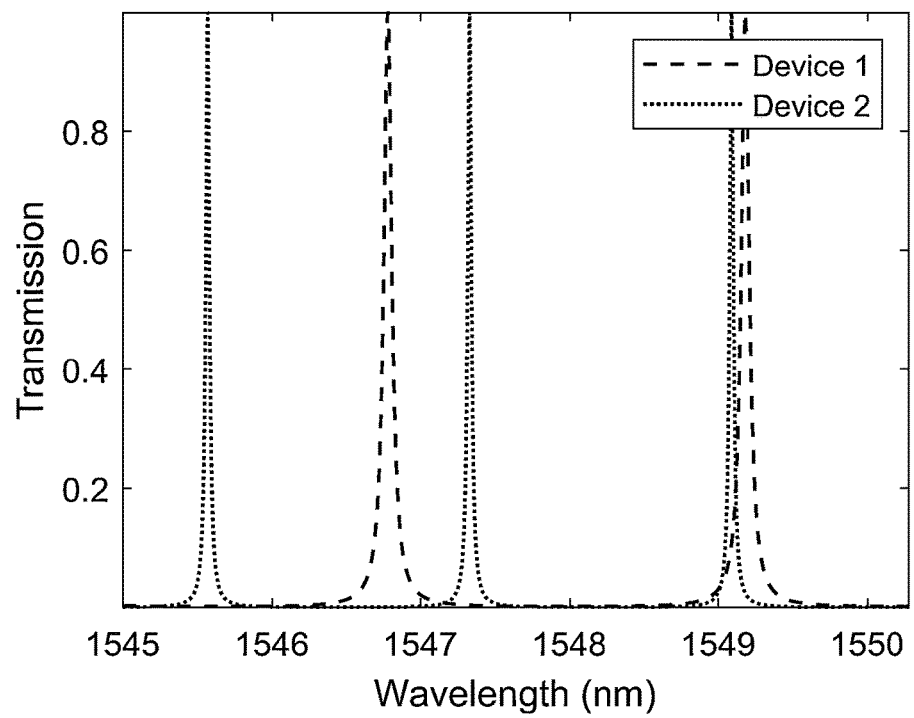
FIG. 11 is a graph of the two devices 1, 2 in a perturbed state, e.g., +8° C.
Figure 12:
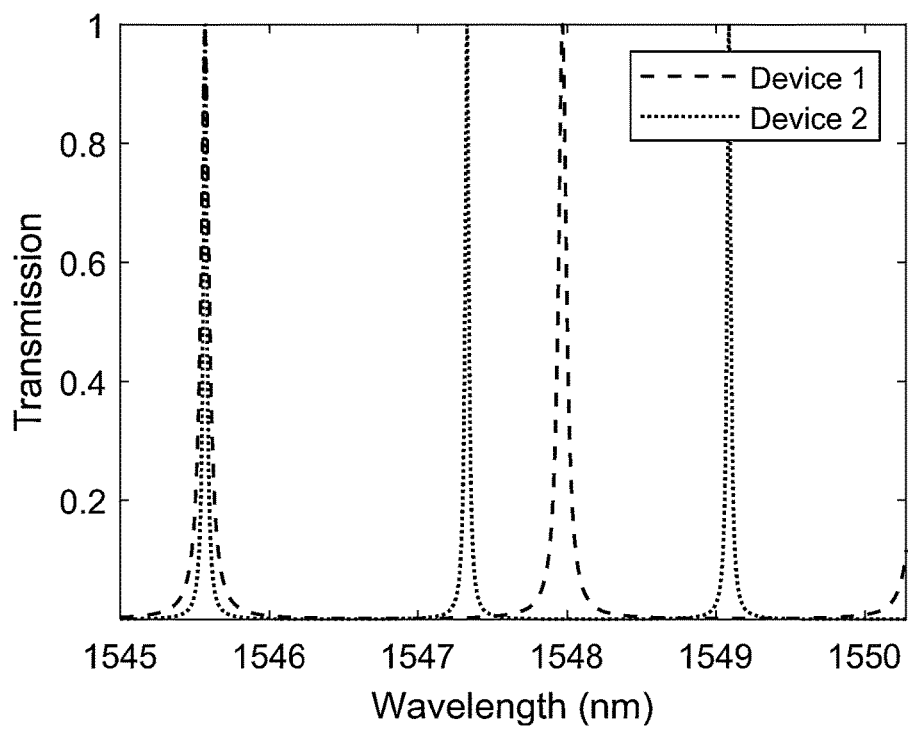
FIG. 12 is a graph of re-locking the perturbed states.

FIG. 11 is a graph of the two above devices 1, 2 in a perturbed state, e.g., +8° C. Of note, from the above table, the device 1 drifts 5× more than the device 2. FIG. 12 is a graph of re-locking the perturbed states.

$\Delta\lambda_{perturbed}$=+1.21 nm, or equivalently −1.19 nm $\Delta\lambda_2$=(1.21 nm−0.70 nm)/(80 pm/16 pm−1)=0.128 nm⇔8° C.×0.016 nm/° C.=0.128 nm $\Delta\lambda_1$=0.128 nm×5=0.640 nm⇔8° C.×0.800 nm/° C.=0.640 nm Use Cases This approach to optical referencing contemplates various use cases such as in a fully integrated nano (industry form factor sized) integrated tunable laser assembly (nITLA). For example, a system can include internal Vernier ring resonators that require frequency selection. Another use case includes wavelength locking or measurement.

Calibration of Cascaded Tunable Optical Filtering Elements

Also, the present disclosure relates to systems and methods for optical referencing from optical references with variable perturbative drift rates, namely for wavelength calibration or locking, in which at least one of the two or more references is stable to perturbations. The present disclosure provides a new approach that utilizes less circuits and is less expensive than existing approaches.

The present disclosure includes a specific arrangement of the components and use of a through/complementary port of a first tunable element to calibrate it absolutely. This calibration is then used to calibrate other tunable elements of the chain. The approach presented here can be readily incorporated in products, such as an optical channel monitor (OCM). The accuracy of the approach depends only on the properties of the broadband source and of the spectral shaper, for which multiple technologies exist that are off-the-shelf components with known stabilities. The approach is also cost-effective.

Figure 13:
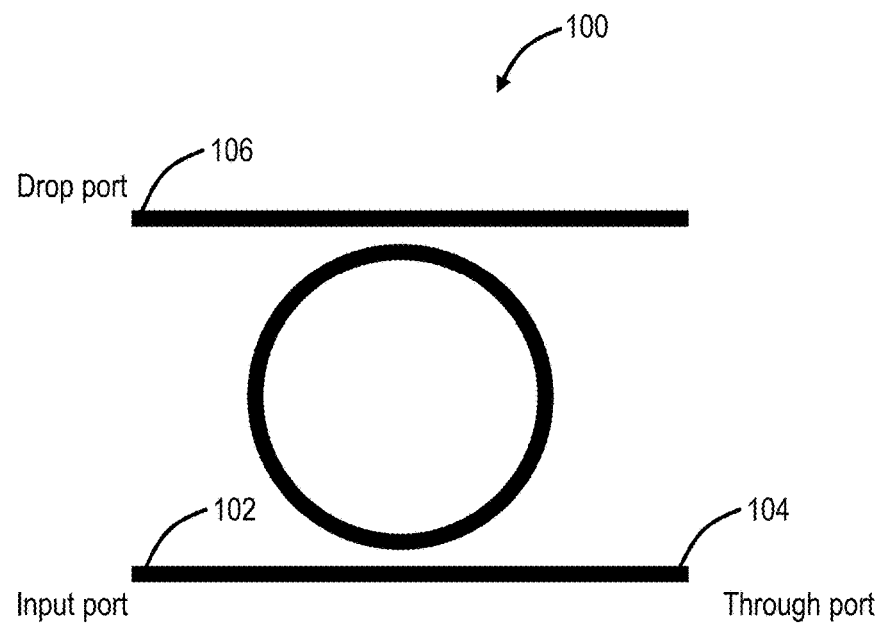
FIG. 13 is a diagram of a ring resonator in an add-drop configuration.
Figure 14:
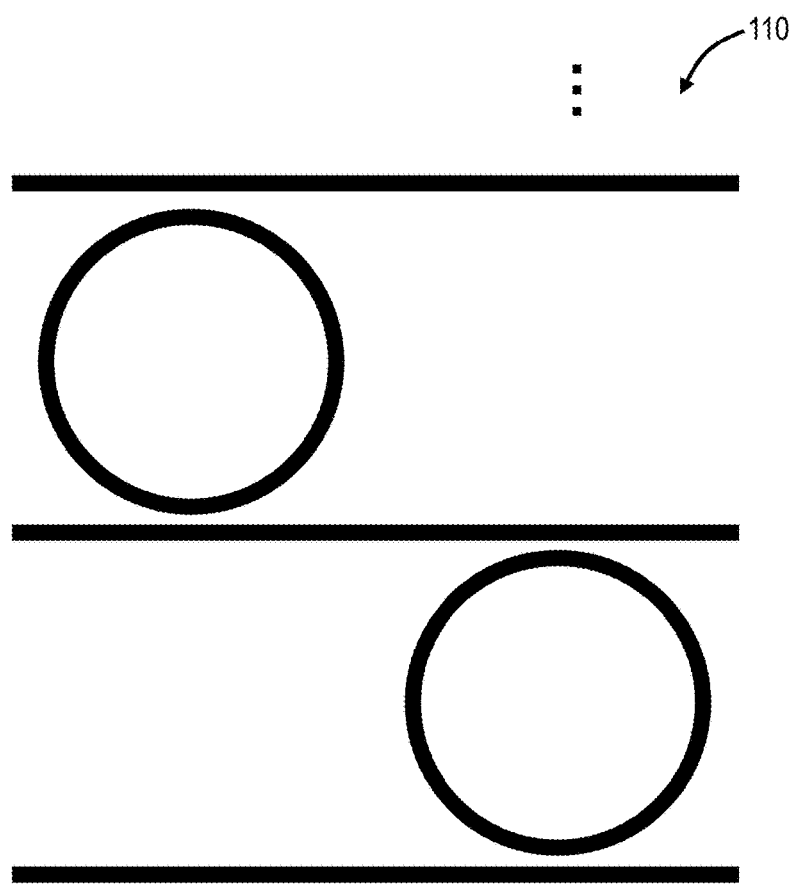
FIG. 14 is a diagram of a series of ring resonators.

The present disclosure includes a calibration process for a series of cascaded integrated resonators containing a "through" and a "drop" port. Such resonators are often used to realize tunable optical filtering functions. FIG. 13 is a diagram of a ring resonator 100 in an add-drop configuration. The ring resonator 100 includes an input port 102, a through port 104, and a drop port 106. FIG. 14 is a diagram of a series of ring resonators 110. Here, the drop port 106 of a previous ring resonator 100 in an input to a next ring resonator 100.

Figure 15:
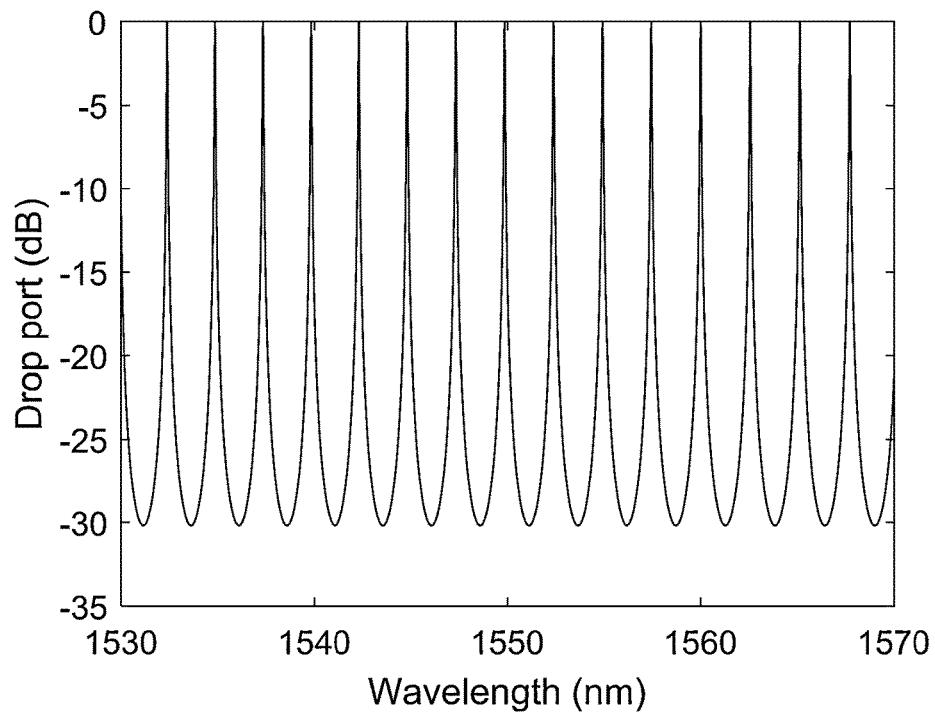
FIG. 15 is a graph of the response of a filter on a drop port of the ring resonator.

FIG. 15 is a graph of the response of a filter on a drop port 106 of the ring resonator 100. The response is a series of peaks spaced by a free spectral range (FSR). The through port 104 response is simply the complementary, minus losses.

Figure 16:
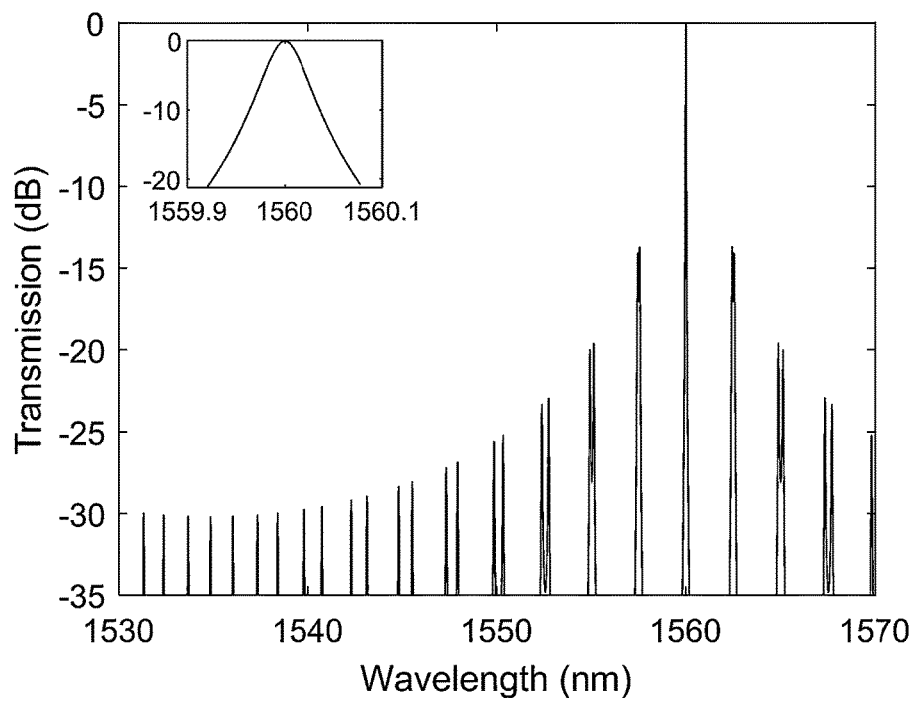
FIG. 16 is a graph of an example of such an optical response for two cascaded rings.

If, at the drop port 106, another such ring resonator 100 is placed, as illustrated in FIG. 14, then the filtering response is the multiplication of the two responses. By designing the rings to have different FSR, the combined response can create a sharp unique peak within an optical band of interest. By making the phase of such rings tunable (for example, by thermo-optic tuning), the position of this peak over the band of interest can be fully controlled. FIG. 16 is a graph of an example of such an optical response for two cascaded rings.

Because the initial phase of the rings is undetermined initially and is essentially random as a consequence of the fabrication process, some efforts must be expended in calibrating the system. This can be achieved by scanning the system at all possible states and building a look-up table (LUT). However, even with accurate calibrations, the system remains highly sensitive to its environment (perturbations). Because the rings can be actuated with heat, this means they are also sensitive to changes in the surrounding temperature. Other perturbations can be the pressure, stresses, infiltration of humidity, or aging of the components (including the actuators tuning the rings).

Figure 17:
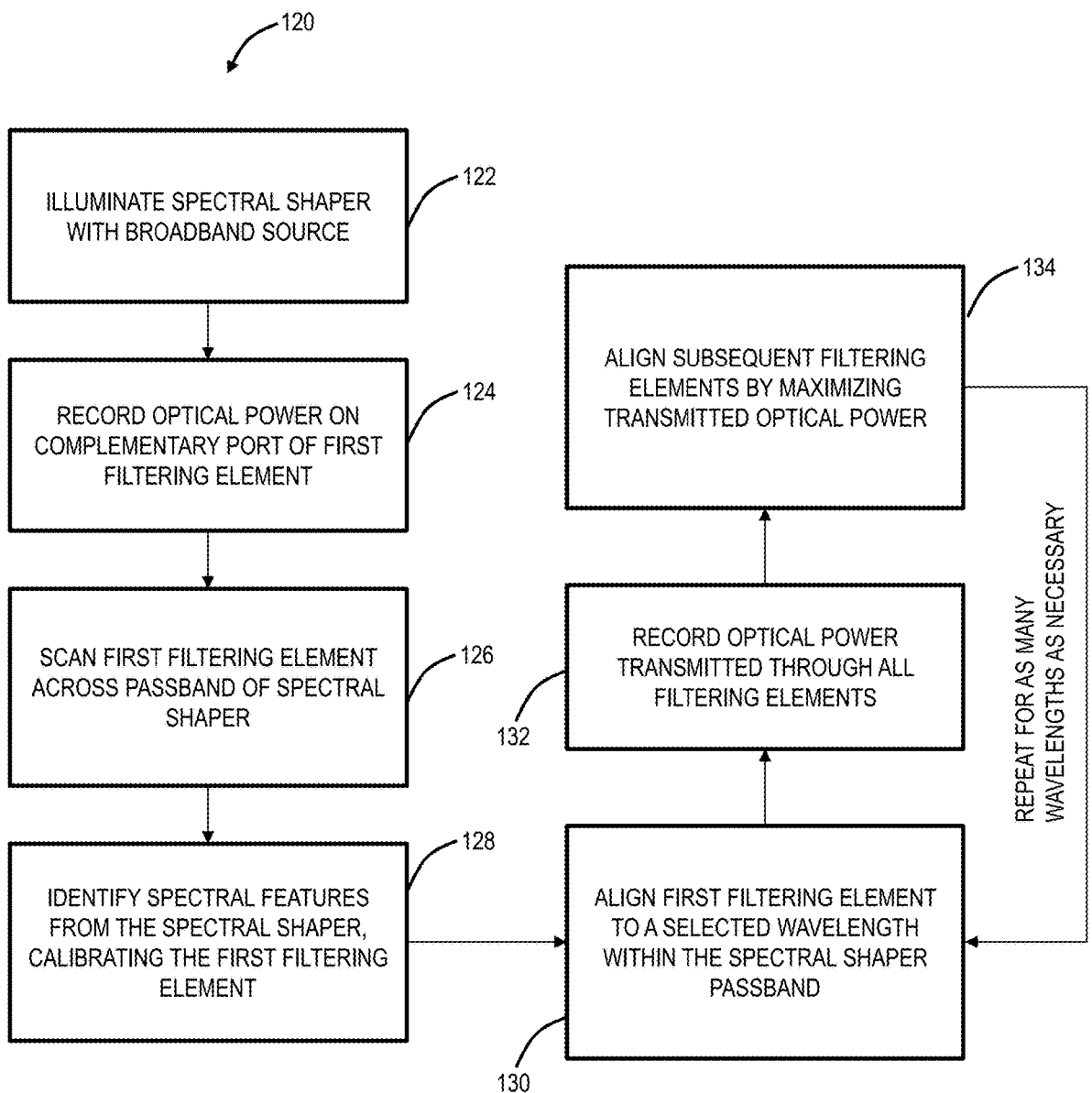
FIG. 17 is flowchart of a process for periodic recalibration.

As such, it is useful to account for a process 120 for periodic recalibration. In the context of a product, this can be referred to as an "online" recalibration, namely "online" because the product is operating. FIG. 17 is flowchart of a process 120 for periodic recalibration. A broadband incoherent source is employed as a light source to illuminate a spectral shaper (step 122). This source can be a super luminescent light emitting diode (SLED), an amplified spontaneous emission (ASE) source, or any large enough band source. This light source does not have to cover the complete optical band of interest, but only the spectral features of the shaper. It is best for this light source to be relatively flat in terms of optical power in the wavelengths of the shaper passband, but this is not a hard requirement. It is also best for this light source to have no polarization dependence to avoid fluctuating power or the need thereby for more stringent polarization controls.

The main characteristic of the spectral shaper is to be insensitive, as much as possible, to environmental perturbations. Its passband must cover an optical band overlapping with the tuning range of the integrated tunable filter. Its spectral features must be resolvable within the resolution of the integrated tunable filter. This spectral shaper can be a commercially available thin-film filter designed to be athermal, a Bragg grating, or any cavity design capable of long-term stability and environmental stability within the precision required by the application.

In one embodiment, the light emitted from the broadband source and transmitted through the spectral shaper is sent to the first resonator of the filter chain. This first resonator contains a "through" and a "drop" port. At the through, a photodetector is placed to record optical power at this port (step 124).

The first resonator of the chain is scanned across its tunable range (step 126). Optical power is recorded at the through port. By knowing the spectral characteristics of the illumination source and of the shaper, which are stable, by convolution with the signal being recorded, the central wavelength of operation for this first resonator at every point of the scan within the passband of the spectral shaper can be known to a great precision.

The through port being the complementary response, it would record close to the full output power delivered by the light source+spectral shaper apparatus if out of alignment with the passband of the spectral shaper. When the filter enters the passband of the spectral shaper, power drops as a fraction is then coupled to the drop port. This power drop is maintained until this first resonator being scanned falls outside the passband of the spectral shaper again. This example is most easily visualized if the spectral shaper consists of a bandpass filter with two well defined edges. Crucially, this through port is not affected by the set point of the subsequent resonators in the chain. This is done with as many data points as needed for the accuracy of the process 120. This now recalibrates the first resonator for these wavelengths of operations (step 128).

The first resonator can now be aligned at any arbitrary wavelength within the passband of the spectral shaper (step 130). The subsequent resonators of the chain are recalibrated by maximizing the final power read at the output of the integrated tunable filter through a plurality of possible optimization methods typically used for nonlinear programming (such as standard gradient descend, Nelder-Mead, sequential quadratic programming, Levenberg—Marquardt, etc.) (steps 132, 134). When the power is maximized, then all resonators have their central passband wavelength necessarily aligned at this wavelength, which is now known. This can be redone for several other wavelengths as necessary.

Because the rate of wavelength tuning is known or can be inferred from fitting through a limited number of wavelengths, it is not necessary to cover the complete optical band of interest where tuning is possible. For this reason, a limited passband for the spectral shaper is sufficient.

Figure 18:
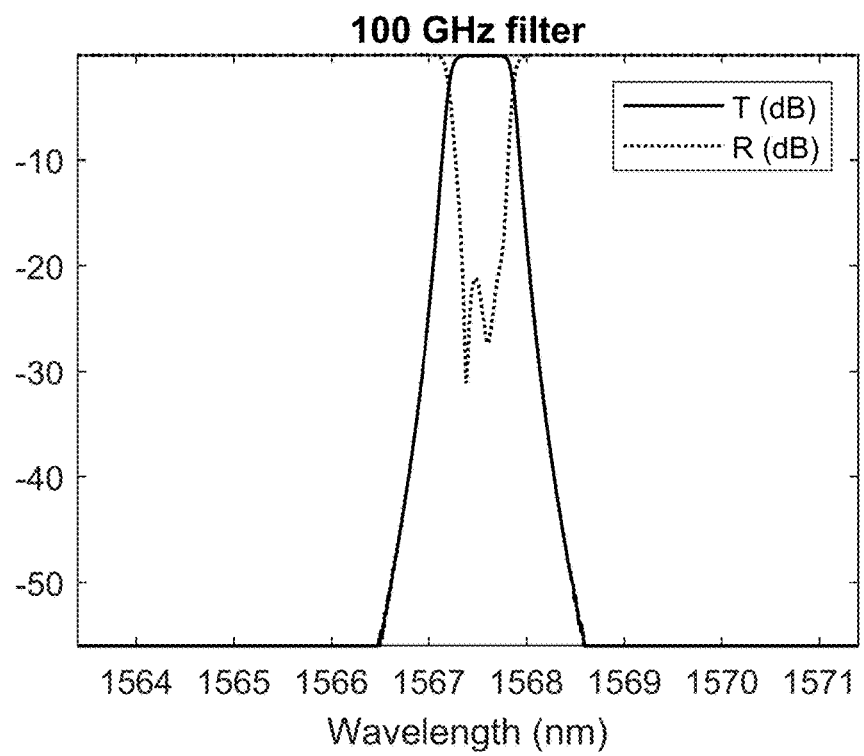
FIGS. 18 and 19 are graphs of two examples of a suitable thin-film spectral shaper, with FIG. 18 illustrating a 100 GHz filter and FIG. 19 illustrating a C/L band filter.
Figure 19:
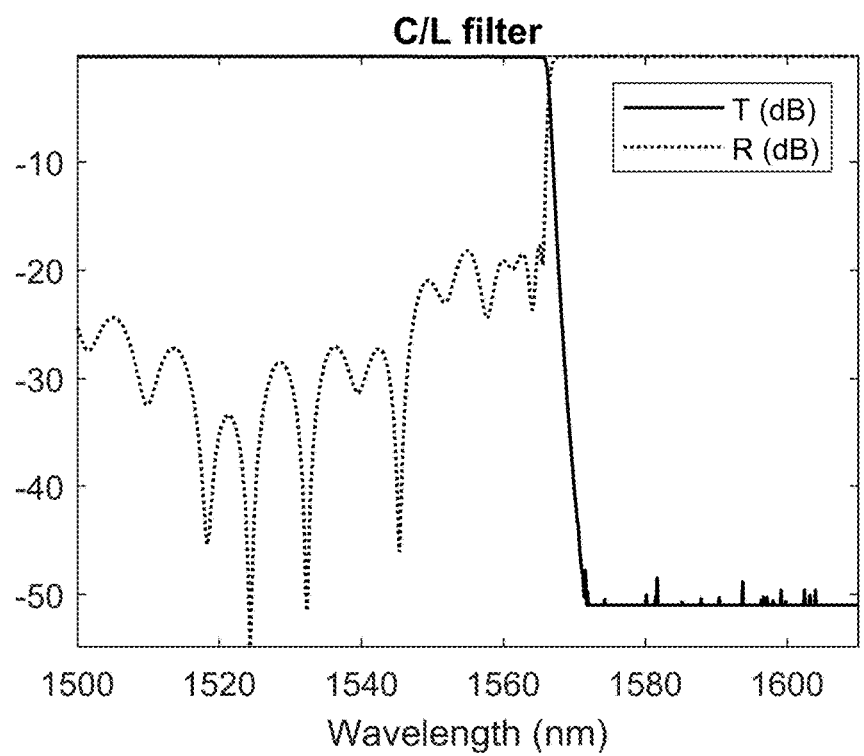
Figure 20:
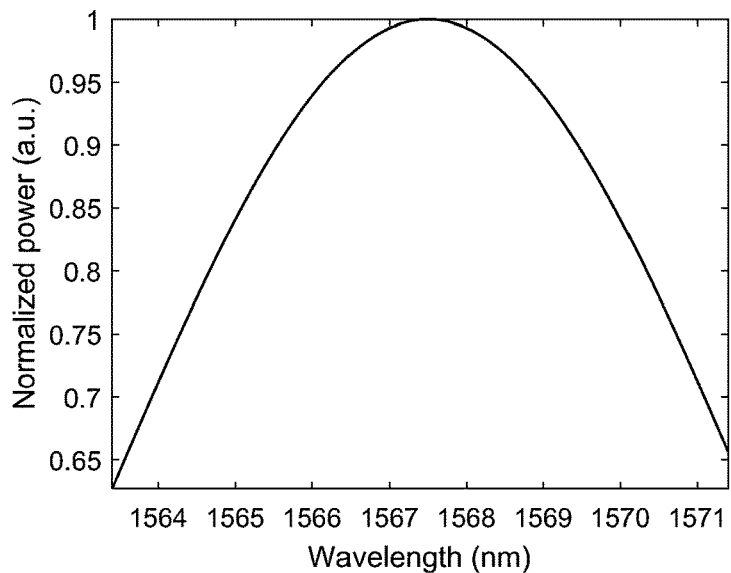
FIG. 20 is graph of an example spectrum of a Gaussian broadband source.
Figure 21:
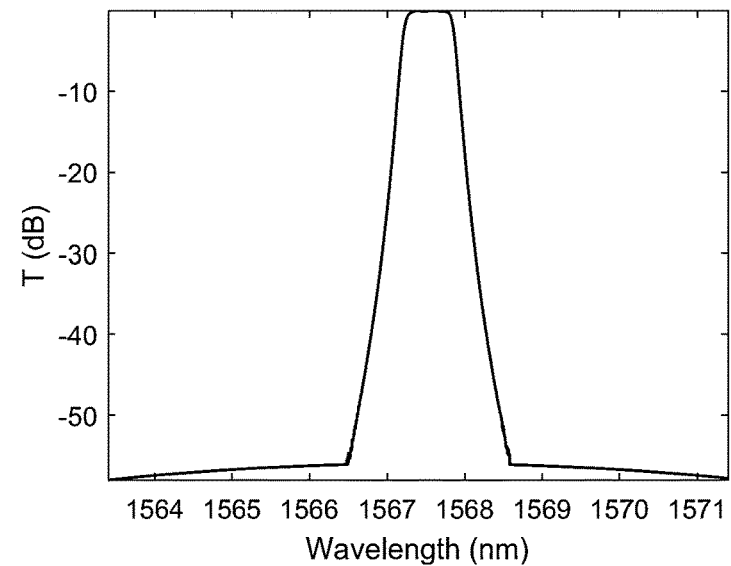
FIG. 21 is a graph of an example of the first filter after being illuminated by the Gaussian broadband source.
Figure 22:
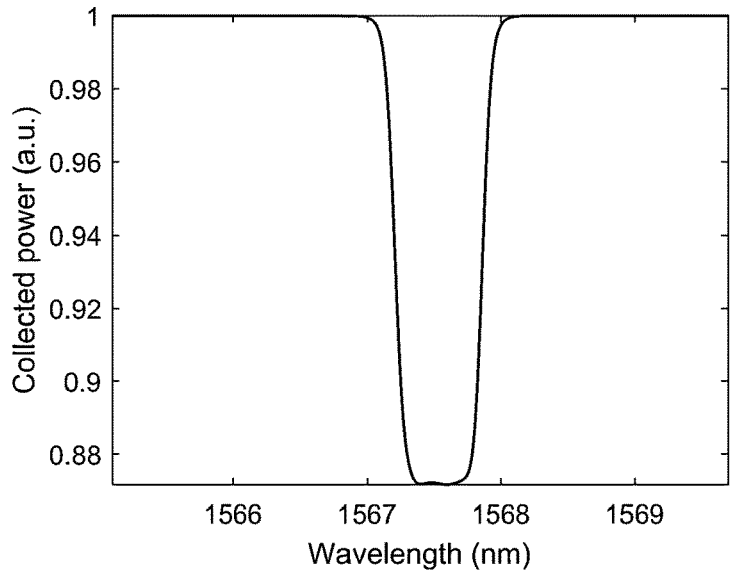
FIG. 22 is a graph of a scan of the spectrum by a first tunable element with a passband of approximately 10 GHz, where the shape of the initial thin-film and its edges are apparent in the form of a complementary shape.

FIGS. 18 and 19 are graphs of two examples of a suitable thin-film spectral shaper, with FIG. 18 illustrating a 100 GHz filter and FIG. 19 illustrating a C/L band filter. FIG. 20 is graph of an example spectrum of a Gaussian broadband source. FIG. 21 is a graph of an example transmission spectrum of the drop port of the first filter after being illuminated by the Gaussian broadband source. FIG. 22 is a graph of the through port resulting from a scan of a first tunable element with a passband of approximately 10 GHz, where the shape of the initial thin-film and its edges are apparent in the form of a complementary shape.

For injection of this light into the main path of the tunable filter, an optical switch can be used, or the (otherwise unused) input port of a power tap placed before the filter chain. The broadband source can be turned on and off to resume normal operation of the filter chain by controlling the current of the broadband source, or by operating a variable optical attenuator (VOA) somewhere upstream in the light path.

Those skilled in the art will recognize the process 120 is not limited to an exact embodiment of a tunable filter as a chain of ring resonators in an add/drop configuration. This can also apply to non-resonant filters having a main and complementary port such as Mach-Zehnder interferometers (MZI) in a cascade or lattice. It can also apply to filters with an output as a reflection if this reflection is properly collected through a circulator, an angled port, or any other mean. It can also apply to non-integrated tunable filters.

Figure 23:
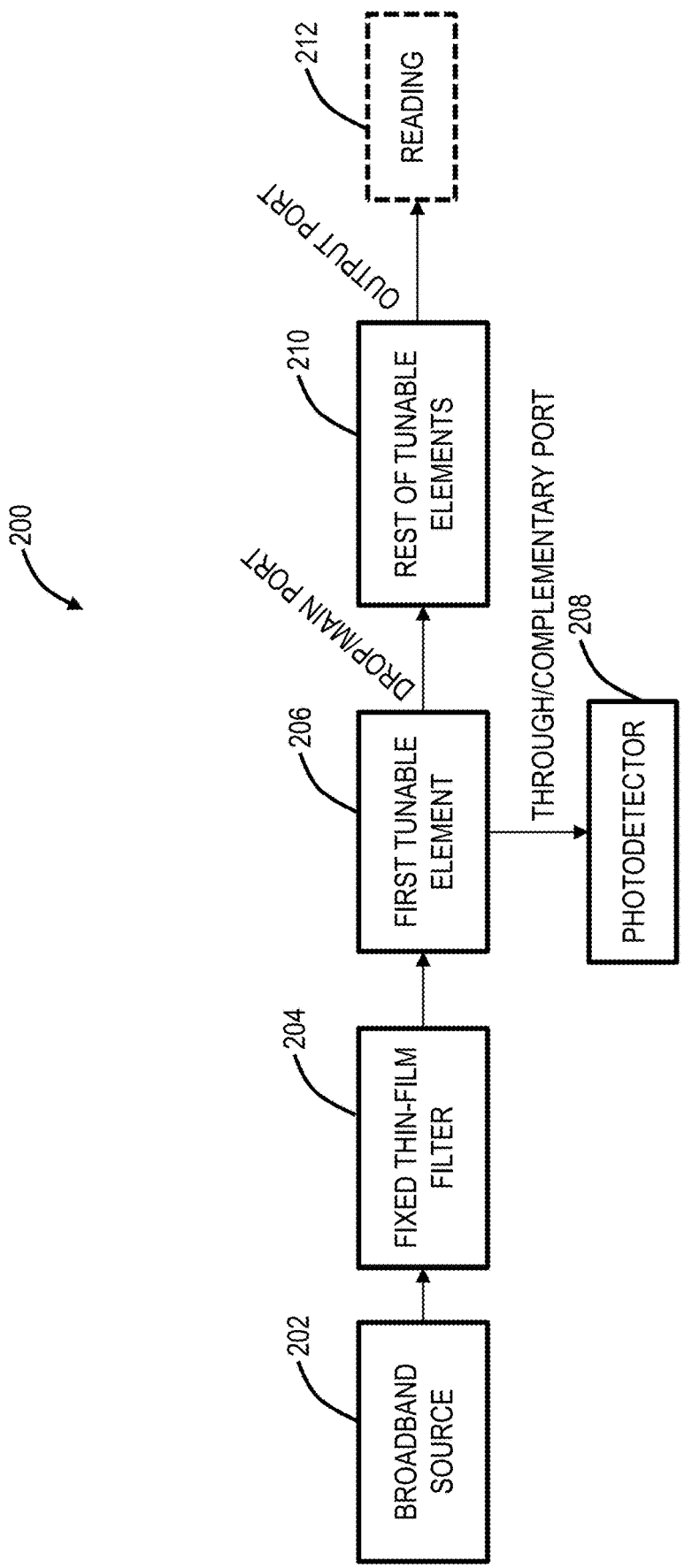
FIG. 23 is a schematic diagram of an optical system illustrating a possible arrangement for implementing the process of FIG. 17.

FIG. 23 is a schematic diagram of an optical system 200 illustrating a possible arrangement for implementing the process 120. The optical system 200 includes a broadband source 202, a fixed thin-film filter 204 as the spectral shaper, a first tunable element 206 having a through port connected to a photodetector 208 and a drop port connected to other tunable elements 210 with an output port where a reading 212 is taken. The optical system 200 can include any of the optical systems 20, 30, 40. Specifically, the tunable element 206 can include the ring resonator 100, etc.

Figure 24:
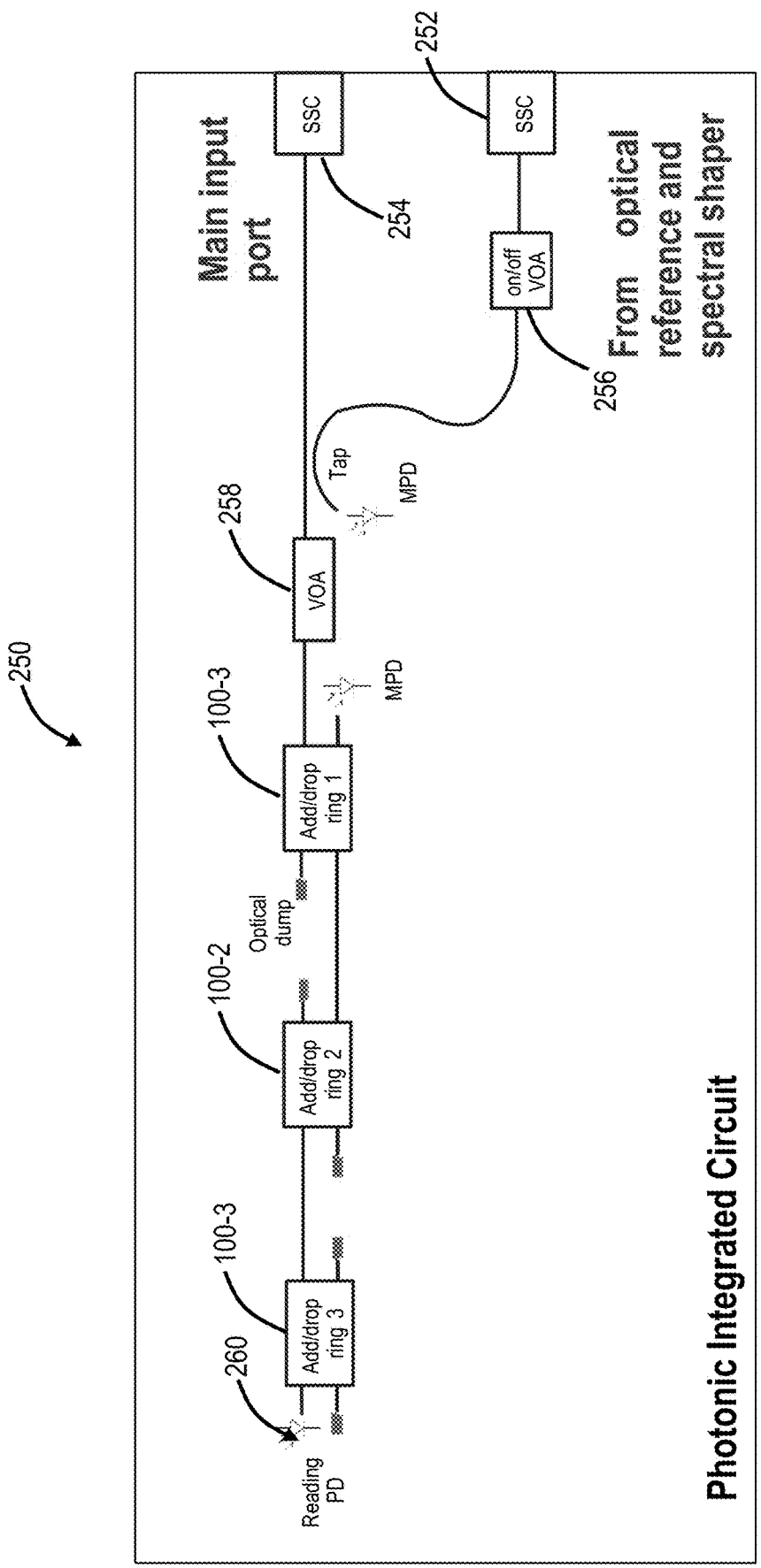
FIG. 24 is a schematic diagram of a photonic integrated circuit illustrating another possible arrangement for implementing the process of FIG. 17.

FIG. 24 is a schematic diagram of a photonic integrated circuit 250 illustrating another possible arrangement for implementing the process 120. The photonic integrated circuit 250 is shown excluding the broadband source 202 and the spectral shaper. These are external to the photonic integrated circuit 250 and connect via spot size converters (SSC) 252, 254. There is an on/off variable optical attenuator (VOA) 256 connected to the optical reference and spectral shaper, and these connect to the main input port via a tap. The photonic integrated circuit 250 includes three ring resonators 100-1, 100-2, 100-3 connected to a VOA 258 and ending with a reading photodetector (PD) 260. There are also various monitoring photodetectors (MPD). Flow in FIG. 24 is from right to left.

Another possible embodiment is the use of an intracavity photodetector exploiting middle bandgap absorption surface state, surface state absorption, defect state absorption, or a combination thereof, to replace the separate complementary port photodetector.

Another alternate embodiment is to use the optical reference provided by the broadband source and optical shaper in all or a subset of the rings instead of injecting the signal from the first one into the other rings. An MPD would then be present in each 'calibration' ring. This would allow for a more flexible calibration of a plurality of rings without a complex tuning scheme to align all of them simultaneously. To avoid crosstalk of the calibration of the first elements into the subsequent ones, a blocking VOA or any other means of shutting down the power (optical switch) should be provisioned in the calibration scheme.

Figure 25:
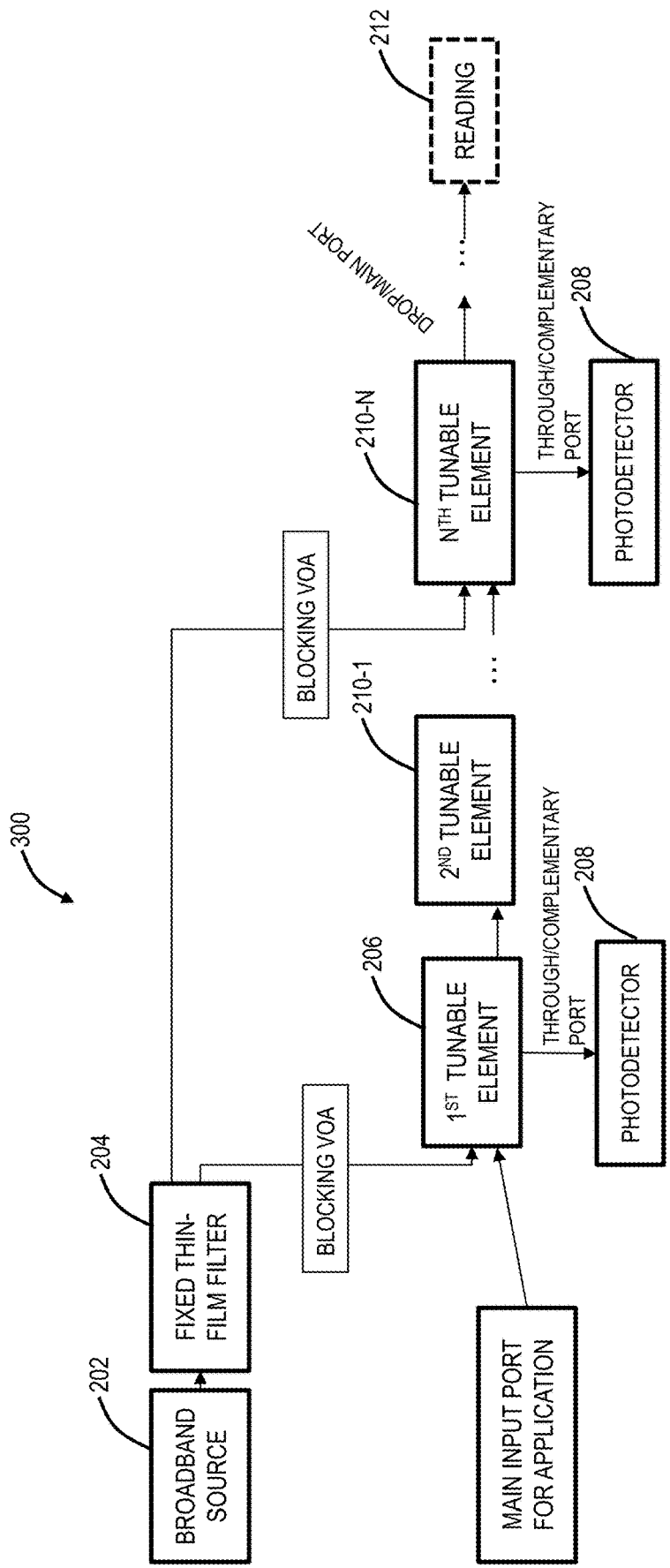
FIG. 25 is a schematic diagram of an optical system illustrating another possible arrangement for implementing the process of FIG. 17.

FIG. 25 is a schematic diagram of an optical system 300 illustrating another possible arrangement for implementing the process 120, namely where the optical reference provided by the broadband source and optical shaper in all or a subset of the rings instead of injecting the signal from the first one into the other rings.

Figure 26:
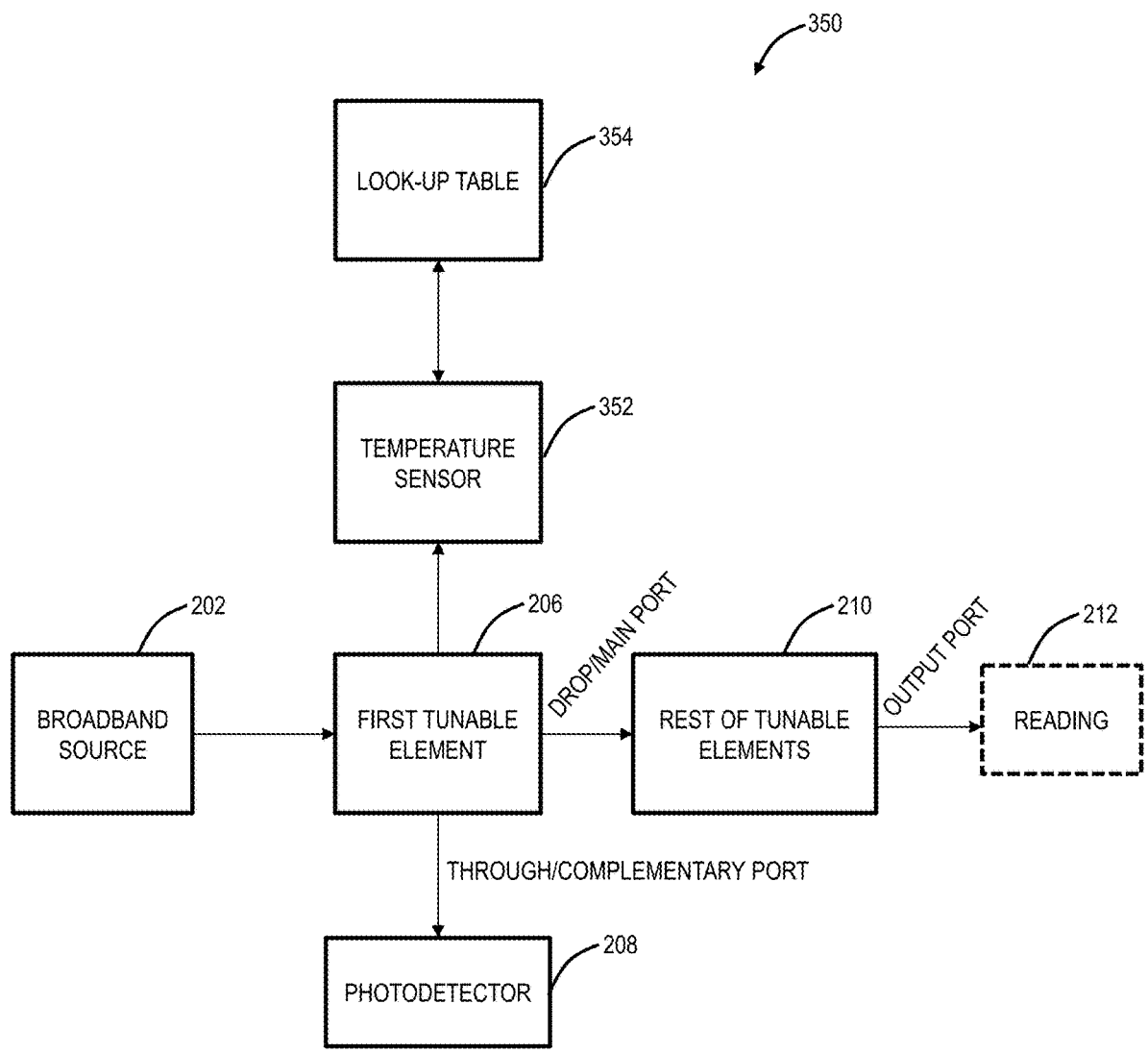
FIG. 26 is a schematic diagram of an optical system 350 illustrating another possible arrangement for implementing the process, namely to provide a self-calibration scheme.

FIG. 26 is a schematic diagram of an optical system 350 illustrating another possible arrangement for implementing the process 120, namely to provide a self-calibration scheme. Yet another alternate embodiment is a 'self-calibration scheme' in which it is assumed that the wavelength accuracy is not critical vis-a-vis a perturbation from the environment other than the temperature on the first ring (i.e., if stresses, aging and humidity wavelength shift on the first ring do not have a significant impact of the overall performance of the intended product). This would allow the removal of the spectral shaper in the arrangement and allow the usage of a simple thermal monitor 352 of the filter (a thermal diode, thermistor, thermocouple or resonant tunneling diode (RTD)) to precisely measure the temperature of the first ring. Due to the high temperature dependence of silicon rings, it is assumed that a temperature monitor is required.

Preferably, the first filter would have the largest FSR to minimize the risk of using the wrong peak to calibrate the other resonators. The first filter position would be known through an initial calibration table 354 against temperature, thus giving the precise position of the multiple peaks. By sweeping the other filters to maximize the output power on the 'reading' port of the device, the complete filter shape can be recalibrated as explained in the first embodiment of the invention. Thus, this other embodiment can re-calibrate a very fine filter even though the absolute position of all the resonators/tunable elements is not perfectly accurate.

This calibration process can be simpler and still very useful for applications in which a very fine signal filtering is required but in which the position of the signal to be filtered needs not be known precisely, thus not requiring precise absolute position of the filter.

Process of Optical Referencing in an Optical System

Figure 27:
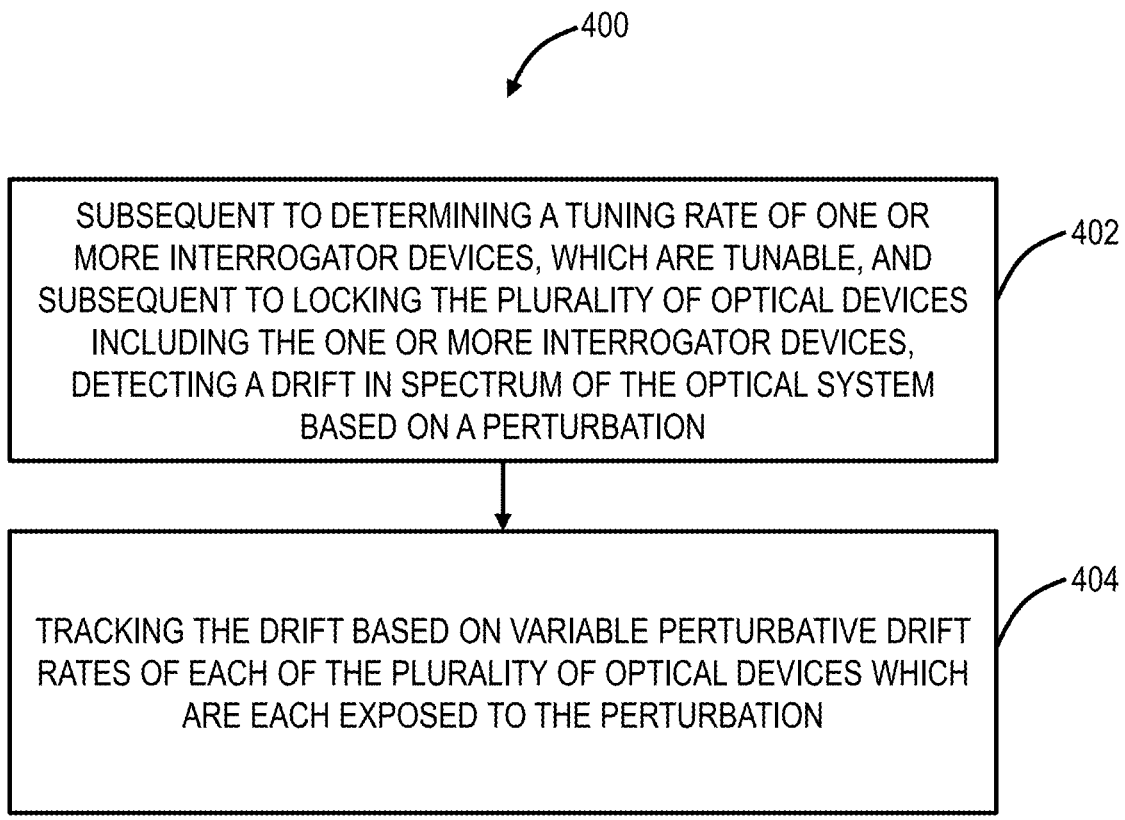
FIG. 27 is a flowchart of a process of optical referencing in an optical system including a plurality of optical devices with variable perturbative drift rates.

FIG. 27 is a flowchart of a process 400 of optical referencing in an optical system including a plurality of optical devices with variable perturbative drift rates. The process 400 can be implemented with any of the optical systems 20, 30, 40, 110, 200, 250, 300, 350. Also, some or all of the process 400 can be realized as a method having steps, via a processing device or circuitry configured to execute the steps, via instructions for the steps stored in a non-transitory computer-readable medium.

The process 400 includes, subsequent to determining a tuning rate of one or more interrogator devices, which are tunable, and subsequent to locking the plurality of optical devices including the one or more interrogator devices, detecting a drift in spectrum of the optical system based on a perturbation (step 402); and tracking the drift based on variable perturbative drift rates of each of the plurality of optical devices which are each exposed to the perturbation (step 404). The tracking is based on knowledge of an initial state based on the locking and knowledge of the variable perturbative drift rates.

The process 400 can include, for calibration, determining the tuning rate of one or more interrogator devices; locking the plurality of optical devices by maximizing optical power at an output of the optical system; and storing an obtained operating point on the one or more interrogators after the locking. The variable perturbative drift rates can be predetermined based on material properties of the plurality of optical devices, at least two devices have different materials.

The plurality of optical devices can include any of ring or disk resonators, Mach-Zehnder or Michelson interferometers, Fabry-Perot etalons, Bragg gratings and thin-film filters. The process 400 can include determining a wavelength of a source utilizing the tracking. The process 400 can include performing a measurement based on the tracking. The plurality of optical devices includes at least two optical devices. The process 400 can include performing the tracking based on gradients of the variable perturbative drift rates between the at least three optical devices. The optical system excludes a temperature sensor. The optical system can be one of a tunable laser and an optical channel monitor (OCM).

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method of optical referencing in an optical system including a plurality of optical devices with variable perturbative drift rates, the method comprising the steps of:
subsequent to determining a tuning rate of one or more tunable optical devices of the plurality of optical devices, and subsequent to locking the plurality of optical devices including the one or more tunable optical devices, detecting a drift in spectrum of the optical system based on a perturbation; and
tracking the drift based on variable perturbative drift rates of each of the plurality of optical devices which are each exposed to the perturbation, wherein tracking comprises adjusting the one or more tunable optical devices to maintain optical alignment.

2. The method of claim 1, wherein the tracking includes mapping the drift to an absolute frequency scale based on an initial state based on an initial stored operating point obtained from a beginning-of-life (BOL) alignment and predetermined relative drift rates between the plurality of optical device.

3. The method of claim 1, wherein the steps further include
for calibration, aligning the one or more tunable optical devices by maximizing optical power at an output of the optical system; and
storing an obtained operating point on the one or more lunable optical devices after the aligning.

4. The method of claim 1, wherein the variable perturbative drift rates are predetermined based on material properties of the plurality of optical devices, at least two devices having different materials.

5. The method of claim 1, wherein the plurality of optical devices includes any of ring or disk resonators, Mach-Zehnder or Michelson interferometers, Fabry-Perot etalons, Bragg gratings or thin-film filters.

6. The method of claim 1, wherein the steps further include
determining a wavelength shift of a source utilizing the tracking based on a known initial wavelength of the source.

7. The method of claim 1, wherein the steps further include
performing a measurement based on the tracking.

8. The method of claim 1, wherein the plurality of optical devices includes at least three optical devices, and wherein the steps further include
performing the tracking based on gradients of the variable perturbative drift rates between the at least three optical devices.

9. The method of claim 1, wherein the optical system excludes a temperature sensor.

10. The method of claim 1, wherein the optical system is one of a tunable laser and an optical channel monitor (OCM).

11. An optical system configured to provide optical referencing, the optical system comprising:
a source;
a plurality of optical devices including one or more tunable optical devices, connected to the source;
a photodetector connected to the plurality of optical devices; and
circuitry configured to
subsequent to a determination of a tuning rate of the one or more tunable optical devices, and subsequent to locking the plurality of optical devices, detect a drift in spectrum of the optical system based on a perturbation, and
track the drift based on variable perturbative drift rates of each of the plurality of optical devices which are each exposed to the perturbation.

12. The optical system of claim 11, wherein the circuitry is configured to track the drift by mapping the drift to an absolute frequency scale based on an initial state based on an initial stored operating point obtained from a beginning-of-life (BOL) alignment and predetermined relative drift rates between the plurality of optical device.

13. The optical system of claim 11, wherein the circuitry includes
a stored value for the tuning rate of one or more tunable optical devices, and
obtained operating points on the one or more tunable optical devices after the locking.

14. The optical system of claim 11, wherein the variable perturbative drift rates are predetermined based on material properties of the plurality of optical devices, at least two devices having different materials.

15. The optical system of claim 11, wherein the plurality of optical devices includes any of ring or disk resonators, Mach-Zehnder or Michelson interferometers, Fabry-Perot etalons, Bragg gratings or thin-film filters.

16. The optical system of claim 11, wherein the circuitry is configured to determine a wavelength shift of the source based on a known initial wavelength of the source.

17. The optical system of claim 11, wherein the circuitry is configured to perform a measurement based on the drift.

18. The optical system of claim 11, wherein the plurality of optical devices includes at least three optical devices, and wherein the circuitry is configured to
track the drift based on gradients of the variable perturbative drift rates between the at least three optical devices.

19. The optical system of claim 11, wherein the optical system is one of a tunable laser and an optical channel monitor (OCM).

20. The optical system of claim 11, wherein the optical system includes a series of cascaded integrated resonators each with a through port and a drop port, and wherein the circuitry is further configured to align a first integrated resonator utilizing its through port by maximizing optical power at a wavelength and subsequently align remaining integrated resonators by maximizing the optical power at the wavelength.

* * * * *